United States Patent
Takama et al.

(10) Patent No.: US 8,537,082 B2
(45) Date of Patent: Sep. 17, 2013

(54) DISPLAY AND ELECTRONIC APPARATUS

(75) Inventors: Daisuke Takama, Kanagawa (JP); Hiroyuki Kawazoe, Kanagawa (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 963 days.

(21) Appl. No.: 12/330,703

(22) Filed: Dec. 9, 2008

(65) Prior Publication Data

US 2009/0153451 A1   Jun. 18, 2009

(30) Foreign Application Priority Data

Dec. 18, 2007  (JP) ................................. 2007-326176

(51) Int. Cl.
*G09G 3/34* (2006.01)

(52) U.S. Cl.
USPC ................................. 345/84; 345/87; 345/92

(58) Field of Classification Search
USPC ................... 345/84, 173, 175, 174, 176, 177, 345/207
See application file for complete search history.

(56) References Cited

U.S. PATENT DOCUMENTS

| | | | | |
|---|---|---|---|---|
| 6,020,945 | A * | 2/2000 | Sawai et al. | 349/119 |
| 2006/0192766 | A1* | 8/2006 | Nakamura et al. | 345/173 |
| 2006/0262258 | A1* | 11/2006 | Wang et al. | 349/117 |
| 2007/0046639 | A1* | 3/2007 | Swedin | 345/173 |
| 2007/0182719 | A1* | 8/2007 | Lee et al. | 345/173 |

FOREIGN PATENT DOCUMENTS

| | | |
|---|---|---|
| JP | 11-134105 | 5/1999 |
| JP | 2002-149085 | 5/2002 |
| JP | 2002-41244 | 8/2003 |
| JP | 2004-318067 | 11/2004 |
| JP | 2004-318819 | 11/2004 |

* cited by examiner

*Primary Examiner* — Joseph Feild
*Assistant Examiner* — Andrew Sasinowski
(74) *Attorney, Agent, or Firm* — K&L Gates LLP

(57) ABSTRACT

A display is provided. The display includes at least one display cell having a display circuit; at least one light receiving cell including a light receiving element; a light emitting section operative to radiate light to the side of a display surface; and a polarizing plate disposed on the front side in the display relative to a region in which the light emitting section is disposed and regions in which the display cell and the light receiving cell are formed, wherein a phase difference plate is disposed at a position which is on the front side relative to the light receiving cell and in either of an emitting optical path of the light emitting section and a reflecting optical path toward the light receiving cell.

19 Claims, 22 Drawing Sheets

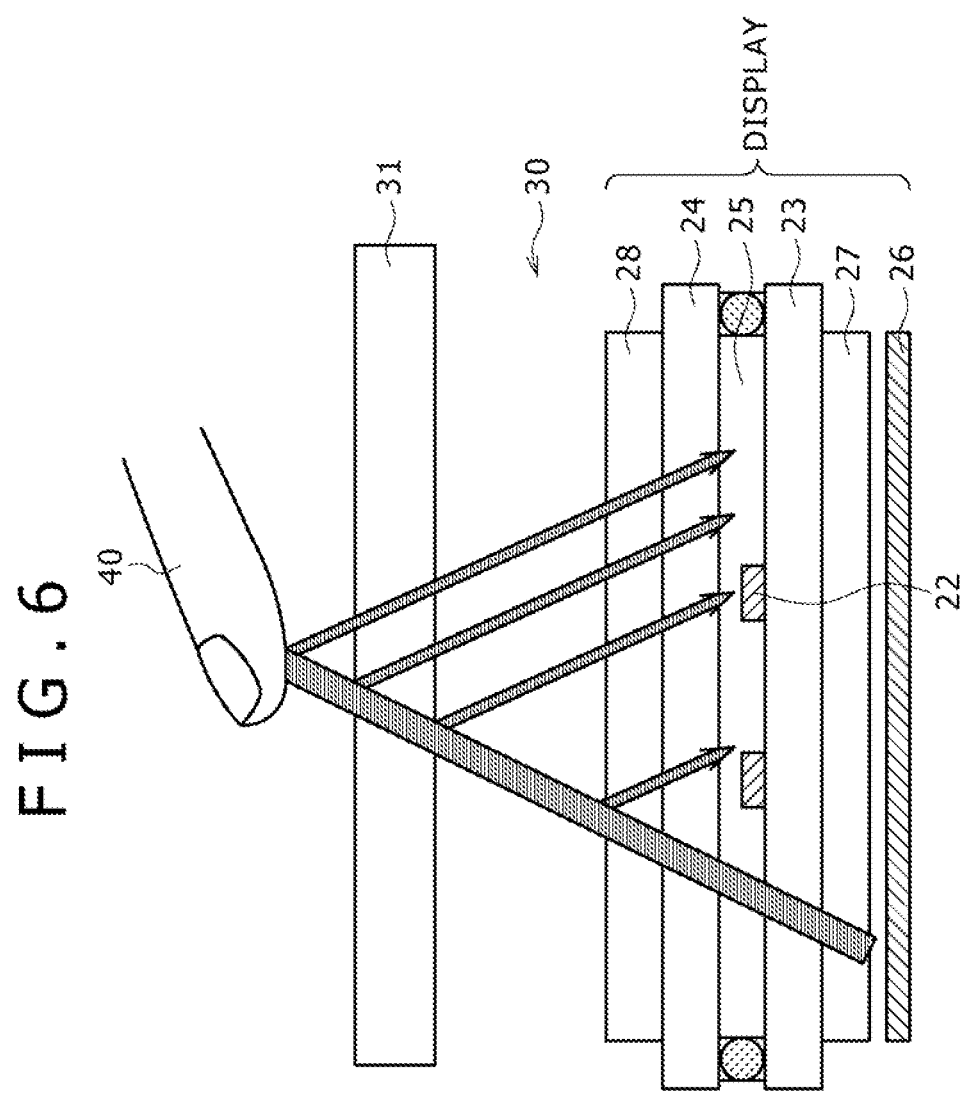

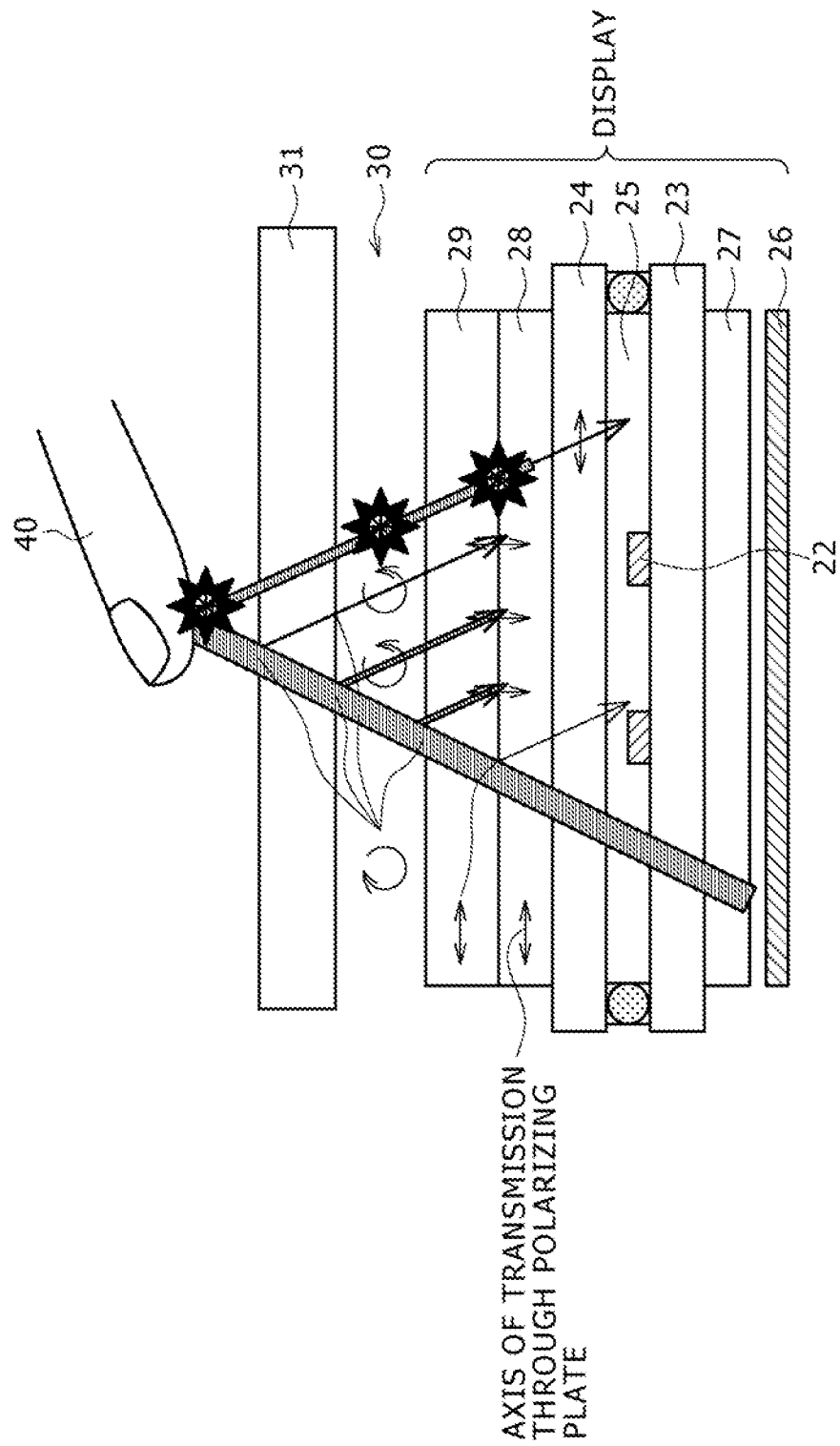

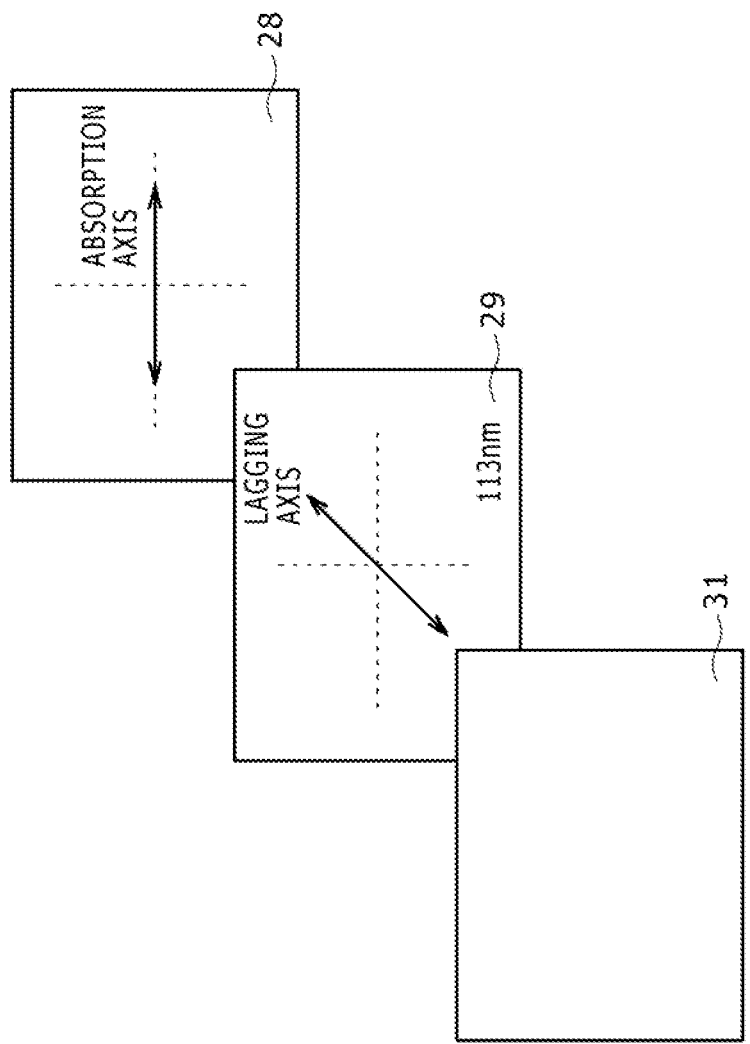

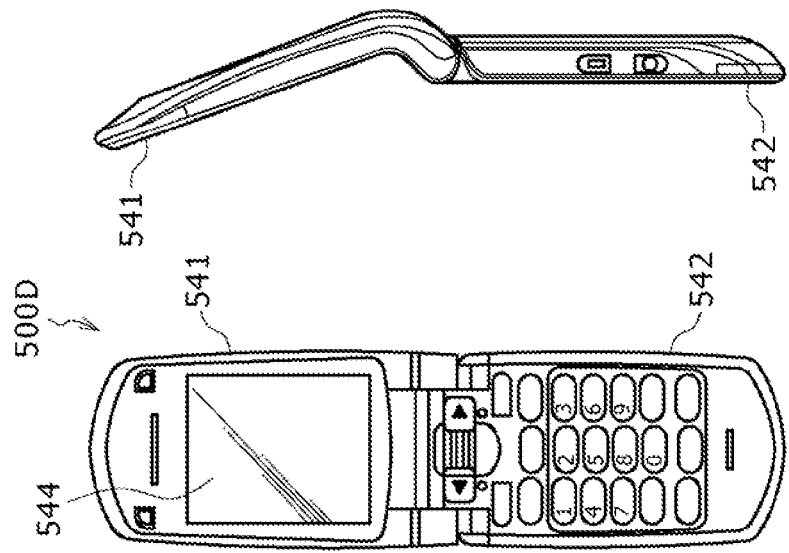
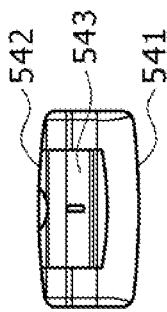
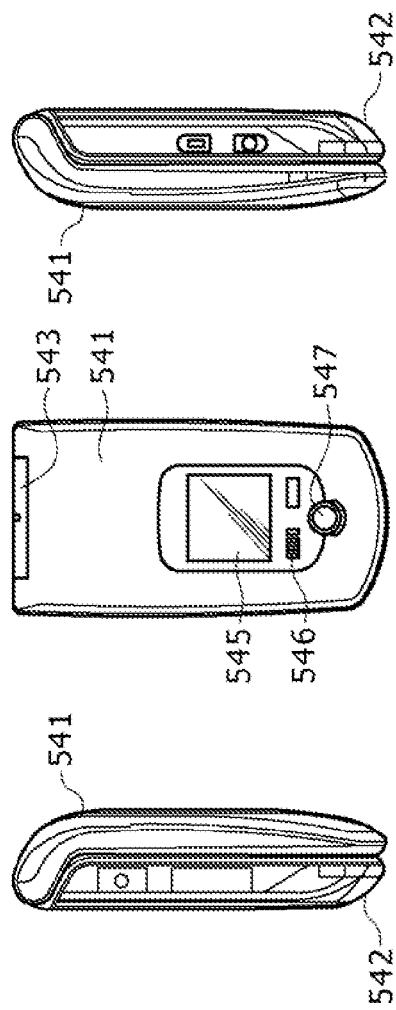
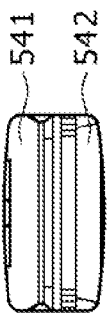

DISPLAY AND ELECTRONIC APPARATUS

CROSS REFERENCES TO RELATED APPLICATIONS

The present application claims priority to Japanese Patent Application JP 2007-326176 filed in the Japan Patent Office on Dec. 18, 2007, the entire contents of which being incorporated herein by reference

BACKGROUND

The present application relates to a display provided with light emitting elements in a display pixel section or on an architrave-like frame thereof.

There have been proposed several technologies in which a display itself is provided with a function for inputting of coordinates.

Specifically, for example, a display of the pressure-sensitive type touch panel system (refer to Japanese Patent Laid-Open Nos. 2002-149085 and 2002-41244), a display of the electromagnetic induction type touch panel system (refer to Japanese Patent Laid-Open No. Hei 11-134105) and the like have been known.

However, the displays provided with such a coordinate inputting function as above-mentioned are difficult to downsize, and are higher in cost than the ordinary displays.

In order to solve these problems, development has been vigorously made of displays in which each pixel is provided with a light receiving element and the coordinates in the display are specified by detection of light incident on the light receiving elements (refer to Japanese Patent Laid-Open Nos. 2004-318067 and 2004-318819).

The display thus provided with the light receiving elements to enable inputting of coordinates in the display can be advantageously reduced in size and cost, as compared with the displays provided with the coordinate inputting function, and has a further advantage in that multi-point coordinate inputting and area inputting are possible.

Thus, recently, development of a liquid crystal display device having also a photo-sensor element in each pixel has been in progress. For example, with a photo-sensor element provided in each pixel, it is possible to realize a scanner function and a touch panel function with a normal liquid crystal module structure.

For instance, a touch panel functioned LCD (Liquid Crystal Display) module provided with a photo-sensor in each pixel has been reported and demonstrated in Session 24 of SID 2007.

Such a technology of incorporating photo-sensor elements in a liquid crystal display device is indispensable to user interfacing of displays in the future, and is one of the promising technologies.

SUMMARY

Meanwhile, in recent years, a movement toward protection of an LCD surface with a transparent substrate, such as an acrylic resin plate and a glass substrate, so as to achieve an improvement in strength or design has been seen in digital cameras and mobile phones.

However, when an acrylic resin plate is disposed on a photosensor-incorporating LCD, the reflected light generated at the surface of the acrylic resin plate would constitute noise, thereby lowering the sensitivity of the photo-sensors.

For solving this problem, the acrylic resin plate may be subjected to an antireflection treatment, whereby the amount of noise can be reduced.

According to this method, however, films for the antireflection treatment have been fabricated on both sides of the acrylic resin plate, leading to an increase in cost. Further, where the photo-sensor is fabricated by use of thin-film silicon (Si), the sensor sensitivity is higher on the shorter wavelength side of light, so that a film for preventing reflection of light on the shorter wavelength side has to be fabricated on the acrylic resin plate.

This not only leads to an increase in cost through a further increase in the number of layers constituting the antireflection film but also causes the reflected light on the acrylic resin plate under incidence of environmental light to become reddish, thereby spoiling picture quality.

Furthermore, there is dispersion of reflectance in the antireflection film, which leads to dispersion of the S/N (Signal to Noise) of the sensors.

Besides, in addition to the reflection from only the acrylic resin plate, there would be reflection of the back-light light (the light emitted from a back light) on the most face-side surface of the LCD, and the reflected light would be incident on the sensors, thereby lowering the S/N of the sensors.

Thus, there is a need for a display and an electronic apparatus such that the reflected light generated from the most face-side surface of the display or a protective cover disposed on the front side can be eliminated, the influence of noise can be reduced, and the S/N of a light receiving system can be improved.

According to an embodiment, there is provided a display including: at least one display cell having a display circuit; at least one light receiving cell including a light receiving element; a light emitting section operative to radiate light to the side of a display surface; and a polarizing plate disposed on the front side in the display relative to a region in which the light emitting section is disposed and regions in which the display cell and the light receiving cell are formed, wherein a phase difference plate is disposed at a position which is on the front side relative to the light receiving cell and in either of an emitting optical path of the light emitting section and a reflecting optical path toward the light receiving cell.

Preferably, the phase difference plate is formed at the polarizing plate's interface with an air layer.

Preferably, the phase difference plate emits light coming out of the polarizing plate, as circularly polarized light.

In an embodiment, the display further includes a protective transparent substrate disposed on the further front side relative to the polarizing plate, and the phase difference plate is disposed at a position which is on the front side relative to the light receiving cell and in either of an emitting optical path of the light emitting section and a reflecting optical path toward the light receiving cell.

In an embodiment, an air layer is provided between the polarizing plate and the protective transparent substrate, and the phase difference plate is formed at the polarizing plate's interface with the air layer.

In an embodiment, in the just-mentioned display, the phase difference plate emits light coming out of the polarizing plate, as circularly polarized light.

In an embodiment, a filler layer having a refractive index of more than 1 is disposed between the polarizing plate and the protective transparent substrate, and the phase difference plate is formed at the protective transparent substrate's interface with the air layer.

In an embodiment, a surface of the phase difference plate has been subjected to a hard coating treatment.

According to another embodiment, there is provided a display including: at least one display cell having a display circuit; at least one light receiving cell including a light receiving element; a back light operative to illuminate a display surface at a predetermined luminance; a first transparent substrate provided with the display cell and the light receiving element; a second transparent substrate disposed opposite to the first transparent substrate; a liquid crystal layer disposed between the first transparent substrate and the second transparent substrate; a first polarizing plate formed on a surface, opposed to the back light, of the first transparent substrate; and a second polarizing plate formed on the front side of the second transparent substrate, wherein a phase difference plate is disposed at a position which is on the front side relative to the light receiving cell and in either of an emitting optical path of the back light and a reflecting optical path toward the light receiving cell.

According to yet another embodiment, there is provided an electronic apparatus including a display, the display including: at least one display cell having a display circuit; at least one light receiving cell including a light receiving element; a light emitting section operative to illuminate the side of a display surface; and a polarizing plate disposed on the front side in the display relative to a region in which the light emitting section is disposed and regions in which the display cell and the light receiving cell are formed, wherein a phase difference plate is disposed at a position which is on the front side relative to the light receiving cell and in either of an emitting optical path of the light emitting section and a reflecting optical path toward the light receiving cell.

According to still yet another embodiment, there is provided an electronic apparatus including a display, the display including: at least one display cell having a display circuit; at least one light receiving cell including a light emitting element; a back light operative to illuminate a display surface at a predetermined luminance; a first transparent substrate provided with the display cell and the light receiving element; a second transparent substrate disposed opposite to the first transparent substrate; a liquid crystal layer disposed between the first transparent substrate and the second transparent substrate; a first polarizing plate formed on a surface, opposed to the back light, of the first transparent substrate; and a second polarizing plate formed on the front side of the second transparent substrate, wherein a phase difference plate is disposed at a position which is on the front side relative to the light receiving cell and in either of an emitting optical path of the back light and a reflecting optical path toward the light receiving cell.

In an embodiment, the light going out of the polarizing plate (outgoing light), for example, is transmitted through the phase difference plate, to be right-handed circularly polarized light (or left-handed circularly polarized light). This light is surface reflected at the face-side and back-side surfaces of the protective transparent substrate. The reflected light is in the state of left-handed circularly polarized light (or right-handed circularly polarized light). This reflected light is again transmitted through the phase difference plate, to be linearly polarized light with an inclination of 90° relative to the linearly polarized outgoing light.

This ensures that the light reflected by the protective transparent substrate is absorbed by the polarizing plate.

On the other hand, the light reflected by an object to be detected such as a finger undergoes cancellation of polarization, so that the vibrating direction of the light is substantially random. Therefore, the light reflected from the finger has random vibrating directions even after passing through the protective transparent substrate and the phase difference plate at the most face-side surface. Then, substantially half the light is absorbed by the polarizing plate, and the residual light is able to be incident on the light receiving elements of the light receiving cells.

According to an embodiment, the reflected light from the most face-side surface of the display and from a protective cover disposed on the front side thereof can be eliminated. As a result, the influence of noise can be reduced, and the S/N of the light receiving system can be improved Additional features and advantages are described herein, and will be apparent from the following Detailed Description and the figures.

BRIEF DESCRIPTION OF THE FIGURES

FIG. 6 is a diagram for illustrating the mechanism of reflection of back-light light in an ordinary LCD module not having any phase difference plate;

FIG. 7 is a diagram for illustrating the mechanism of reflection of back-light light in an LCD module having a phase difference plate according to the present embodiment;

FIG. 8 is a drawing which shows the directions of an absorption axis of a second polarizing plate (front-side polarizing plate) and a lagging axis of a phase difference plate, as viewed from the display direction, in an LCD module having the phase difference plate according to the present embodiment;

FIGS. 19A to 19G illustrate a portable terminal device, for example, a mobile phone to which the present embodiment is applied;

DETAILED DESCRIPTION

An embodiment of the present application will be described below referring to the attached drawings.

At the onset, the basic configuration and functions of a liquid crystal image display having light receiving elements on the basis of each display pixel will be described, and thereafter embodiments pertaining to specific structures will be described.

Figure 1:
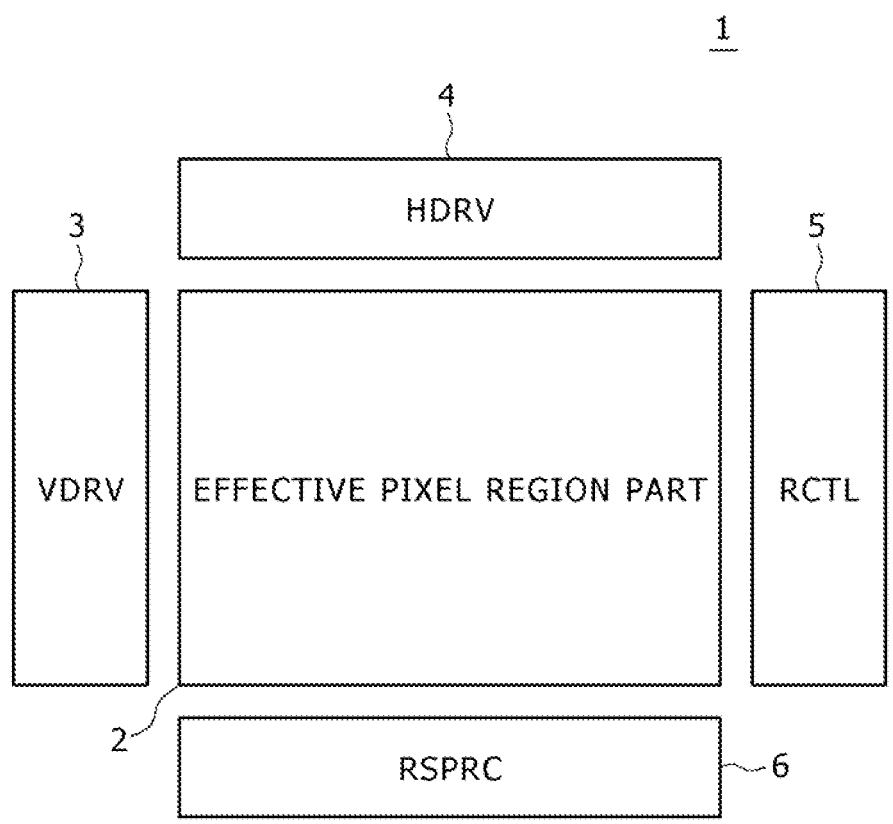
FIG. 1 is a block diagram showing a configuration example of a liquid crystal display according to one embodiment.

FIG. 1 is a block diagram showing a configuration example of a liquid crystal display according to one embodiment.

Figure 2:
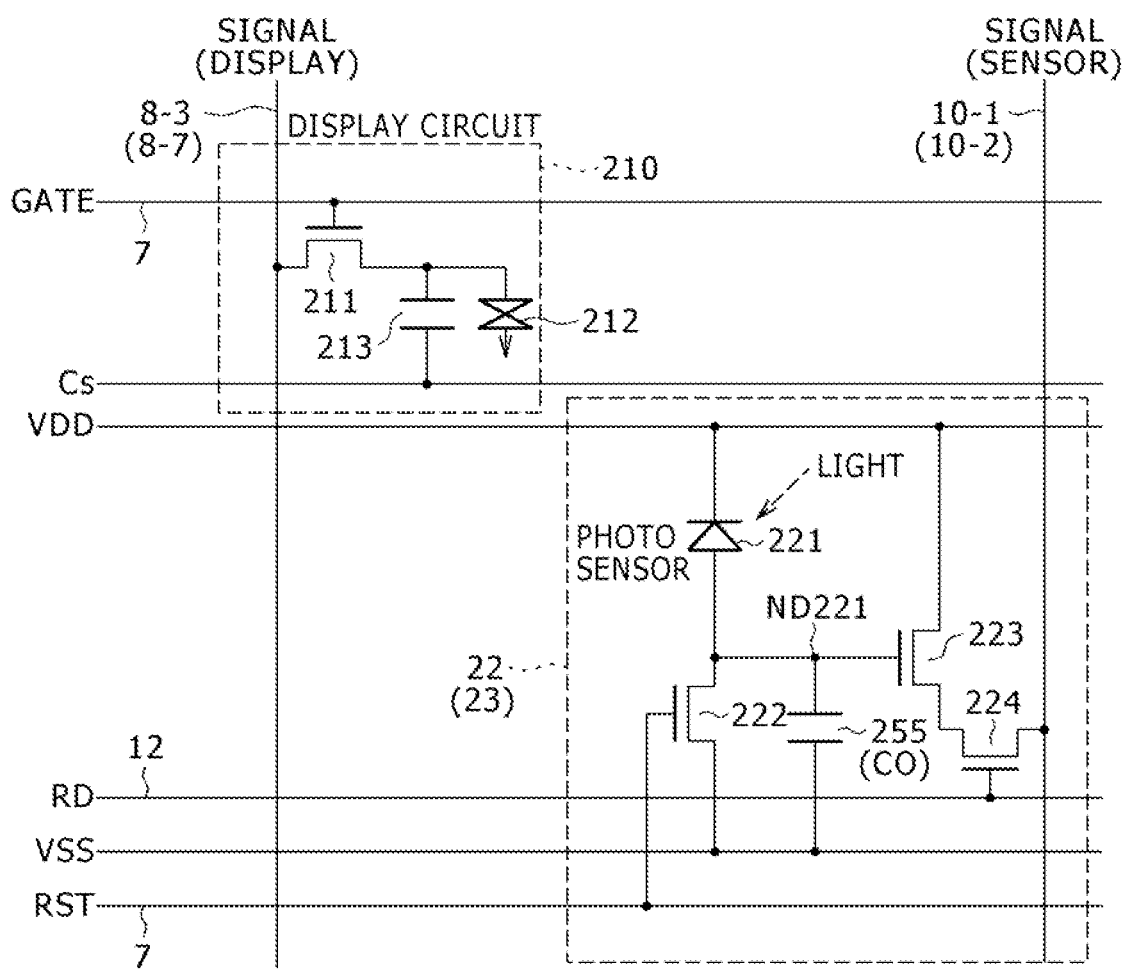
FIG. 2 is a circuit diagram showing a configuration example of a display cell and a light receiving cell according to one embodiment.

FIG. 2 is a circuit diagram showing a basic configuration example of a display cell and a light receiving cell according to the present embodiment. In FIG. 2, the display cell and the light receiving cell are presented adjacently.

As shown in FIG. 1, the liquid crystal image display 1 includes an effective pixel region part 2, a vertical driving circuit (VDRV) 3, a horizontal driving circuit (HDRV) 4, a light reception control circuit (RCTL) 5, and a light reception signal processing circuit (RSPRC) 6.

The effective pixel region part 2 has arranged therein a plurality of display cells 21 inclusive of display circuits 210 forming the display pixels.

In addition, light receiving cells 22 are arranged in the effective pixel region part 2 or a region adjacent thereto. As for arrangement of the light receiving cells 22, one light receiving cell may be arranged for a plurality of pixels, or one light receiving cell may be arranged for each of RGB in the pixel, or one light receiving cell may be arranged for each pixel.

No special remark is to be made in regard of the layout of the light receiving elements in the display in the case of applying the present application. With the present application thus applied to the display in which the light receiving cells are incorporated, light reception signals with little influence of noise can be used in the subsequent processing steps, and light reception (imaging) can be performed while preventing displaying-side signals from mixing into imaging-side signals.

In this embodiment, basically, a transparent substrate as a protective cover is disposed on the front side (upper part) in the display, and at least one phase difference plate is adhered, for example, to a most face-side surface (front side) of the display at a position in either of an emitting optical path and a reflecting optical path of a light emitting section (a light emitting element or a back light) for illuminating a display surface, so as to ensure that the reflected light from the interface between the upper-part transparent substrate (protective cover) and the air and that the S/N of the sensors can be improved.

This device structure will be described in detail later.

As shown in FIG. 2, the display circuit 210 in each display cell 21 has a thin film transistor (TFT) 211, a liquid crystal cell (LC) 212 having a pixel electrode connected to a drain electrode (or a source electrode) of the TFT 211, and a holding capacitance (Cs) 213 having one electrodes connected to the drain electrode of the TFT 211.

For each of the display cells 21, scanning lines (gate lines) 7-1 to 7-*m* are laid on a row basis along the pixel array direction, whereas signal lines 8-1 to 8-*n* are laid on a column basis along the pixel array direction.

The gate electrodes of the TFTs 211 of the display cells 21 are connected to the same one of the scanning lines (gate lines) 7-1 to 7-*m* on a row basis. In addition, the source electrodes (or drain electrodes) of the TFTs 211 of the display cells 21 are connected to the same one of the display signal lines 8-1 to 8-*n* on a column basis.

In the configuration of FIG. 2, the scanning lines 7-1 to 7-*m* are connected to the vertical driving circuit 3, and are driven by the vertical driving circuit 3.

Besides, the display signal lines 8-1 to 8-*n* laid correspondingly to the display cells 21 are connected to the horizontal driving circuit 4, and are driven by the horizontal driving circuit 4.

Further, in a general liquid crystal display, pixel holding capacitance wirings (Cs) 9-1 to 9-*m* are laid independently, and the holding capacitances 213 are formed between the pixel holding capacitance wirings 9-1 to 9-*m* and connection electrodes.

In the display cell 21 in each pixel part 20, an opposite electrode of the liquid crystal cell 212 and/or the other electrode of the holding capacitance 213 is supplied with a predetermined DC voltage as a common voltage VCOM through a common wiring.

Or, alternatively, the opposite electrode of the liquid crystal cell 212 and the other electrode of the holding capacitance 213, in each display cell 21, are supplied with a common voltage VCOM of which the polarity is reversed on the basis of one horizontal scanning period (1H).

In addition, in the effective pixel region part 2, light reception signal lines 10 are laid correspondingly to the light receiving cells 22.

The light reception signal lines 10 are connected to the light reception signal processing circuit 6 so as to transfer a signal, which is read under the control of the light reception control circuit 5, to the light reception signal processing circuit 6.

Supplied with a vertical start signal VST, a vertical clock signal VCK and an enable signal ENB, the vertical driving circuit 3 performs a process of scanning in the vertical direction (column direction) on the basis of one field period so as to sequentially select, on a row basis, the display cells 21 connected to the scanning lines 7-1 to 7-*m*.

More specifically, when a scanning pulse SP1 is given from the vertical driving circuit 3 to the scanning line 7-1, the pixels in the columns in the first row are selected, and, when a scanning pulse SP2 is given to the scanning line 7-2, the pixels in the columns in the second row are selected. Similarly then on, scanning pulses SP3, . . . , SPm are sequentially given to scanning lines 7-3, . . . , 7-*m*.

Supplied with a horizontal start pulse HST for commanding the start of horizontal scanning and horizontal clocks HCK in mutually reverse phases to be a reference of horizontal scanning, which are generated by a clock generator (not shown), the horizontal driving circuit 4 generates sampling pulses, sequentially samples inputted image data R (red), G (green) and B (blue) in response to the sampling pulses generated, and supplies the display signal lines 8-1 to 8-*n* with the sampled data as data signals to be written into the display cells 21.

In addition, first light receiving cell control lines (reset signal lines) 11 and second light receiving cell control lines (reading signal lines) 12 are laid along the pixel array direction, for the light receiving cells 22.

Besides, the light receiving cells 22 are connected to a power source potential VDD and a reference potential VSS.

As shown in FIG. 2, the light receiving cell 22 in the present embodiment has a light receiving element 221, a reset TFT 222, an amplifying TFT 223, a selecting (reading) TFT 224, a light reception signal storage capacitance (capacitor) 225, and a node ND 221.

The light receiving element 221 is formed by use of a TFT, a diode or the like.

In addition, a reading circuit 220 (230) of the light receiving cell 22 has the reset TFT 222, the amplifying TFT 223, the selecting (reading) TFT 224, a capacitor 225, and the node ND 221.

The light receiving element 221 is connected between the power source potential VDD and the node ND 221. The reset TFT 222 is formed by use of an n-channel transistor, for example, and its source is connected to the reference potential VSS (for example, a ground GND), while its drain is connected to the node ND 221. Besides, the gate electrode of the reset TFT 222 is connected to the first light receiving cell control line 11 wired in the corresponding row.

Of the amplifying TFT 223, the gate is connected to the node ND 221, the drain is connected to the power source potential VDD, and the source is connected to the drain of the selecting TFT 224. Of the selecting TFT 224, the gate is connected to the second light reception signal control line 12, and the source is connected to the light reception signal line 10 wired in the corresponding column.

The amplifying TFT 223 and the selecting TFT 224 constitute a so-called source follower. Therefore, a current source is connected to the light reception signal line 10. The current source, in the present embodiment, is formed in the light reception signal processing circuit 6, for example.

Besides, the capacitor (light reception signal storage capacitance) 225 is connected between the node ND 221 and the reference potential VSS.

The first light receiving cell control line 11 and the second reception signal wiring 12 are connected to the light reception control circuit 5.

The light reception control circuit 5 impresses a reset pulse RST on the first light receiving cell control line 11 at a predetermined timing.

This results in that the reset TFT 222 of each light receiving cell 22 is kept ON for a predetermined period, and the node ND 221 is reset. In other words, the light receiving cell 22 is so operated that the electric charge in the light reception signal storage capacitance connected to the node ND 221, for example, is discharged, whereby the potential of the node ND 221 is set to a reference voltage, and the light receiving cell 22 is put into an initial state.

When a predetermined amount of light is received by the light receiving element 221 in this condition, the light receiving element 221 comes to conduct, whereby the potential of the node ND 221 is raised, and an electric charge is stored in the capacitor (light reception signal storage capacitance) 225.

In this instance, a reading signal RD is impressed on the second light receiving cell control line 12 at a high level by the light reception control circuit 5, whereby the selecting TFT 224 is held in an ON state. This results in that the electric charge accumulated in the capacitor 225 is amplified as an electrical signal by the amplifying TFT 223, and the amplified signal is outputted as a light reception signal to the light reception signal wiring 10 through the selecting TFT 224.

Then, the signal transferred through the light reception signal wiring 10 is inputted to the light reception signal processing circuit 6.

The light reception signal processing circuit 6 performs a noise removing process, for example, by processing a difference signal between a signal generated by the light receiving cell 22 and a signal generated by a reference cell (not shown) which is arranged separately. After performing the noise removing process, the light reception signal processing circuit 6 outputs a signal to a signal processing system (not shown) on the subsequent stage for controlling a predetermined functional section in response to the reception signal inputted to the light receiving cell 22.

Figure 3:
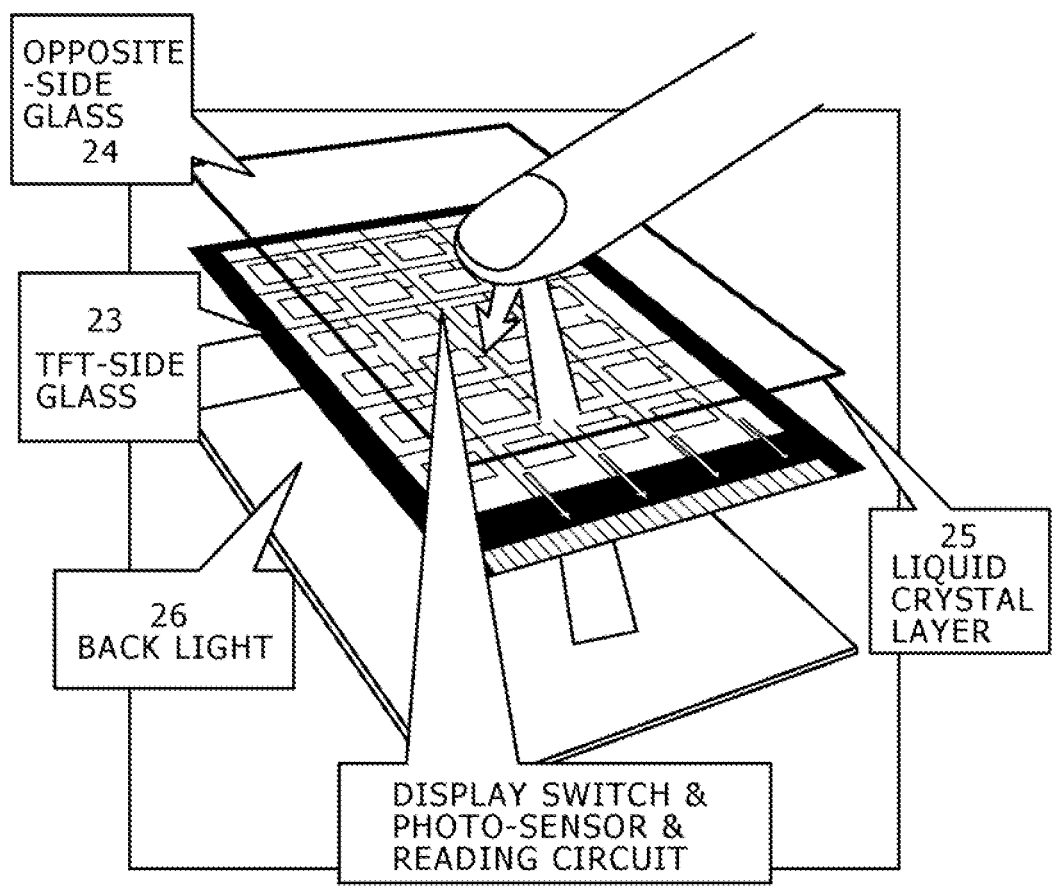
FIG. 3 is a schematic illustration of a system for detecting the light emitted from a back light and reflected.

Incidentally, in the present embodiment, a case where a detection system for realizing a touch panel image sensor or the like by utilizing the reflected light generated by reflection of the back-light light at an object to be detected, as shown in FIG. 3, will be described as an example.

In the present embodiment, the photosensor-incorporating, inputting function-provided type display configured as above has a basic configuration in which the transparent substrate as a protective cover is disposed on the front side (upper part) in the display, and at least one phase difference plate is adhered, for example, to the most face-side surface (front side) of the display at a position in either of the emitting optical path and the reflecting optical path of the back light, so as to ensure that the reflected light from the interface between the upper part transparent substrate (protective cover) and the air can be eliminated and that the S/N of the sensors can be improved.

In addition, a surface of the phase difference plate adhered to the most face-side surface of the display is subjected to a hard coating treatment.

When the display with the configuration in which at least one phase difference plate is adhered to the most face-side surface (front side) of the display is put to use by casting light from the upper part (front side), linearly polarized light polarized in a certain direction can also be used, irrespectively of the direction of polarization.

Besides, when the gap between the upper part (front-side) transparent substrate as the protective cover and the front side of the display is filled with a substance having a refractive index of more than 1 (filler layer), the phase difference plate is adhered to the most face-side surface of the transparent substrate arranged as the protective cover.

In this case, also, when the display is put to use by casting light from the upper part (front side), linearly polarized light polarized in a certain direction can also be used, irrespectively of the direction of polarization.

Now, a specific device structure of a liquid crystal display (LCD) module will be described below.

Figure 4:
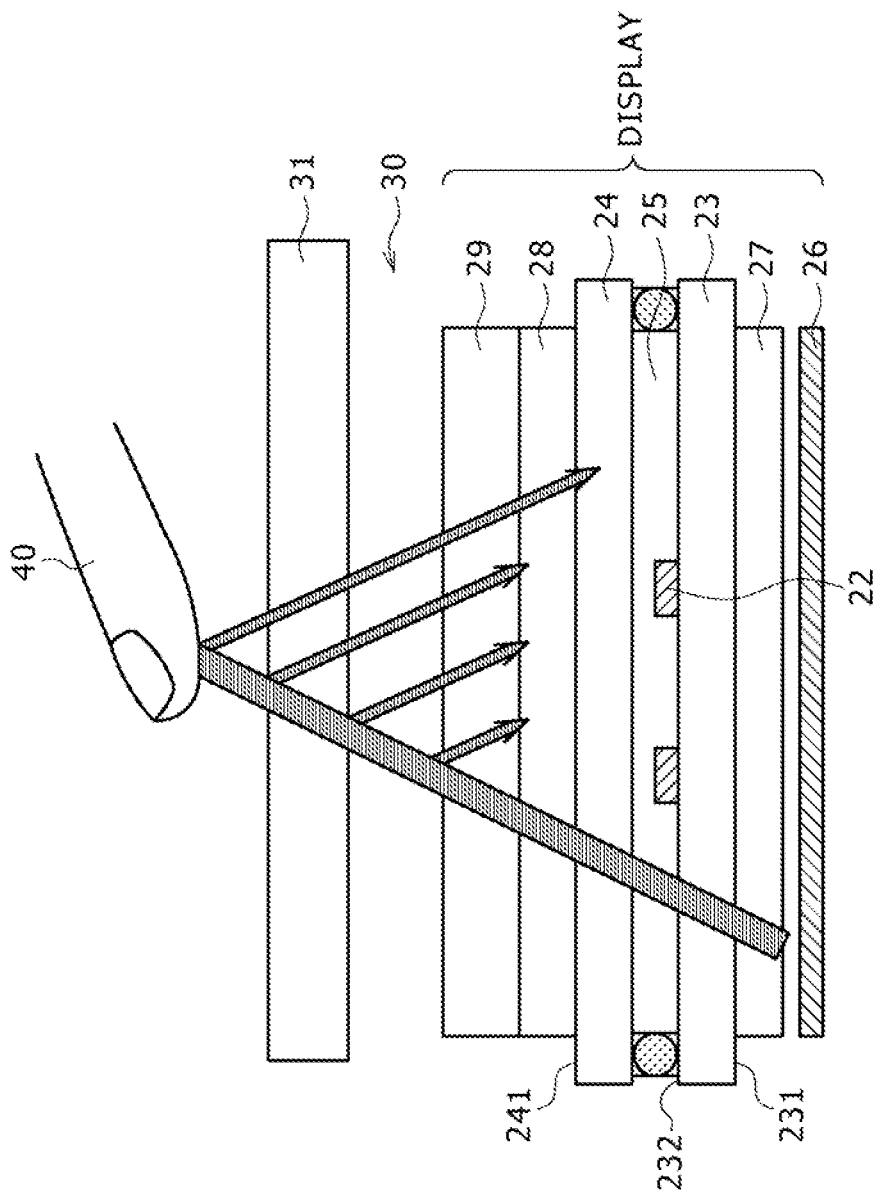
FIG. 4 is a simplified sectional view of a light receiving cell part according to the present embodiment.

FIG. 4 is a simplified sectional view of a light receiving cell part according to the present embodiment.

As shown in FIG. 4, the light receiving cell 22 is formed on the substrate surface 231 side of a TFT substrate 23 formed by use of a transparent insulating substrate (for example, a glass substrate). The light receiving cell 22 includes a reading circuit and a light receiving element (photo-sensor) 221, as above-mentioned.

A liquid crystal layer 25 is sealed between the TFT substrate 23 and an opposite substrate 24 formed by use of an opposite transparent insulating substrate (for example, a glass substrate). In addition, a back light 26 is disposed on the bottom surface 232 side of the TFT substrate 23, for example.

Besides, a first polarizing plate 27 on the back side (lower side) is formed on the bottom surface 232 of the TFT substrate 23, whereas a second polarizing plate 28 on the front side (upper side) is formed on a front surface 241 of the opposite substrate 24.

A phase difference plate 29 is formed on the front side of the second polarizing plate 28 on the front side (upper side).

In addition, a transparent protective cover (front-side transparent substrate) 31 is disposed on the front side of the phase difference plate 29, with an air layer 30 therebetween.

The light receiving element (photo-sensor) 221 and the like are formed, for example, by use of LTPS (low-temperature poly-silicon). Other than LTPS, μ-Si and amorphous Si may also be used. Besides, the structure of the light receiving element may be, for example, PN junction, PIN junction, PDN (Photo sensitive doped layer: P-doped-N) junction or the like. Further, the configuration may be either top gate type or bottom gate type.

Figure 5:
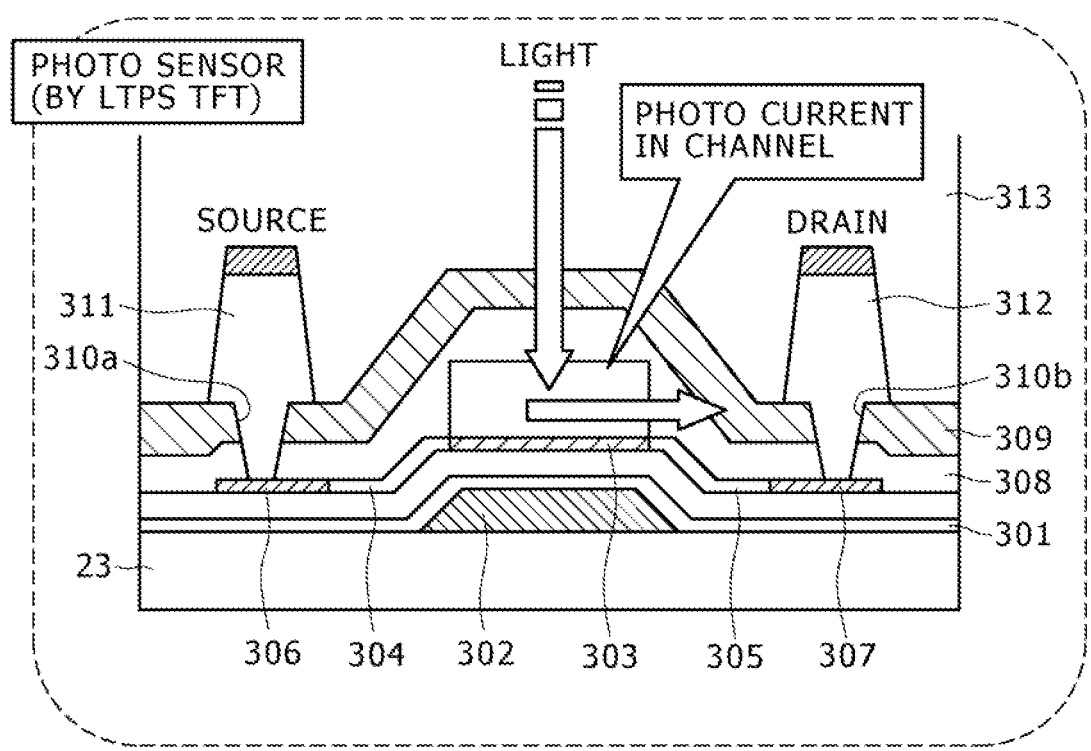
FIG. 5 is a sectional view showing a configuration example in which a photo-sensor (light receiving element) of a light receiving cell is formed by use of a TFT (thin film transistor)

FIG. 5 is a sectional view showing a configuration example in which the photo-sensor (light receiving element) in the light receiving cell is formed by use of a TFT.

A gate electrode 302 covered with a gate insulator film 301 is formed on a TFT substrate 23 (transparent insulating substrate, for example, a glass substrate). The gate electrode is formed, for example, by a method in which a film of a metal, such as molybdenum (Mo) and tantalum (Ta), or an alloy thereof is formed by sputtering or the like.

Over the gate insulator film 301, there are formed a semiconductor film (channel forming region) 303, a pair of $n^-$ diffusion layers (LDD regions) 304, 305 on opposite sides of the semiconductor film 303, and a pair of $n^+$ diffusion layers 306, 307 (source and drain regions) on opposite sides of the semiconductor film 303. Further, an inter-layer insulation film 308 is formed so as to cover the gate insulator film 301, the semiconductor film (channel forming region) 303, the $n^-$ diffusion layers (LDD regions) 304, 305, and the $n^+$ diffusion layers 306, 307 (source and drain regions); besides, an inter-layer insulation film 309 is formed so as to cover the inter-layer insulation film 308. The inter-layer insulation film 309 is formed, for example, from SiN, $SiO_2$ or the like.

A source electrode 311 is connected to the $n^+$ diffusion layer 306 on one side through a contact hole 310a formed in the inter-layer insulation films 308, 309, whereas a drain electrode 312 is connected to the $n^+$ diffusion layer 307 on the other side through a contact hole 10b formed in the inter-layer insulation films 308, 309.

The source electrode 311 and the drain electrode 312 are formed, for example, by patterning of aluminum (Al).

A flattening film 313 is formed over the inter-layer insulation film 309, the source electrode 311, the drain electrode 312, and the inter-layer insulation film 309.

Then, a liquid crystal layer 25 is formed on the flattening film 313.

In this configuration, the gate-electrode of a bottom gate type TFT is formed on an optical path through which back-light light is conducted to the channel region of the TFT. Therefore, the TFT gate electrode has a function of intercepting the light coming from the back light 26 and, hence, a function of reducing noise light.

While an example in which a light leak effect of the TFT is utilized as the photo-sensor is shown here, the photo-sensor is not limited to the poly-silicon TFT, and its concept is applicable to other device configurations exhibiting the same effect as above-mentioned, for example, amorphous-silicon TFT, PIN, PN . . . .

Now, the function of eliminating the reflected light generated from the interface between the transparent protective cover and the air in the above-mentioned device structure will be discussed below.

FIG. 6 illustrates the mechanism of reflection of back-light light in an ordinary LCD module having no phase difference plate.

FIG. 7 illustrates the mechanism of reflection of back-light light in an LCD module having a phase difference plate according to the present embodiment.

FIG. 8 is a drawing which shows the directions of an absorption axis of a second polarizing plate (front-side polarizing plate) and a lagging axis of a phase difference plate, as viewed from the display direction, in an LCD module having the phase difference plate according to the present embodiment.

Incidentally, for easier understanding, the same components in the device of FIG. 6 and the device of FIG. 7 are denoted by the same symbols.

In an ordinary LCD module, the light from the back light 26 is converted by the first polarizing plate 27 into linearly polarized light vibrating in a certain direction, which passes through the liquid crystal layer 25. In this instance, the phase difference in the liquid crystal layer 25 varies depending on a voltage impressed on the liquid crystal layer 25.

This results in that the case where the light transmitted through the liquid crystal layer 25 is absorbed by the second polarizing plate 28 and the case where the absorption does not occur are generated, whereby display can be achieved.

The light transmitted through the second polarizing plate 28 is partly reflected at the upper and lower surfaces of the transparent protective cover 31 toward the LCD side when passing through the transparent protective cover 31. The thus reflected light is received by the light receiving elements (photo-sensors) 221 of the light receiving cells 22 on the TFT array substrate 23, thereby lowering the S/N of the sensors.

In order to solve this problem, the phase difference plate 29 may be adhered to the most face-side surface (the front side of the second polarizing plate 28) of the LCD module as in the present embodiment, whereby the reflection from the surfaces of the transparent protective cover 31 can be prevented.

The following experiment was conducted.

The phase difference of the phase difference plate 29 adhered was set to be 113 nm for light of λ=550 nm.

The sensors used in this experiment had been fabricated by use of thin-film poly-silicon, and therefore had a higher sensor sensitivity on the shorter wavelength side.

As the back light, white LEDs each composed of a blue (with a peak at λ=450 nm) LED and a yellow LED were used.

The sensor used here has a sensitivity at the spectrum of blue light in the back-light light. Therefore, by setting the phase difference of the phase difference plate 29 to 113 nm for canceling the reflection at the blue LED, the reflection can be reduced most, whereby the S/N of the sensors can be improved.

As for the orientations in adhering the phase difference plate, the adhesion is so conducted that the angle included between the absorption axis of the second polarizing plate 28 and the lagging axis of the phase difference plate 29 is 45° (the same effect is obtained when this angle is 135°). Incidentally, for a further improvement in the S/N, a combination of a λ/4 plate with a λ/2 may be used, which will always be effective as a λ/4 plate in a certain wavelength band.

Now, the mechanism of enhancement of the sensor S/N achieved when the phase difference plate is adhered to the most face-side surface of the LCD module will be described below, referring to FIG. 7.

The light going out of the second polarizing plate 28 (outgoing light) is converted into right-handed circularly polarized light (or left-handed circularly polarized light) when passing through the phase difference plate 29 adhered to the second polarizing plate 28. The resulting light is surface reflected at the most face-side surface of the LCD and the face-side and back-side surfaces of the transparent protective cover 31. The light thus reflected is in the state of left-handed circularly polarized light (or right-handed circularly polarized light). The reflected light is again transmitted through the phase difference plate 29, to become linearly polarized light which is inclined at 90° against the linearly polarized outgoing light.

This ensures that the light reflected by the transparent protective cover 31 is absorbed by the second polarizing plate 28.

On the other hand, the light reflected by an object 40 to be detected such as a finger undergoes cancellation of polarization, so that the vibrating direction of the light is substantially random. Therefore, the light reflected from the finger has random vibrating directions even after passing through the transparent protective cover 31 and the phase difference plate 29 at the most face-side surface. Then, substantially half the light is absorbed by the second polarizing plate 28, and the residual light is able to be incident on the light receiving elements (photo-sensors) 221 of the light receiving cells.

Figure 9A:
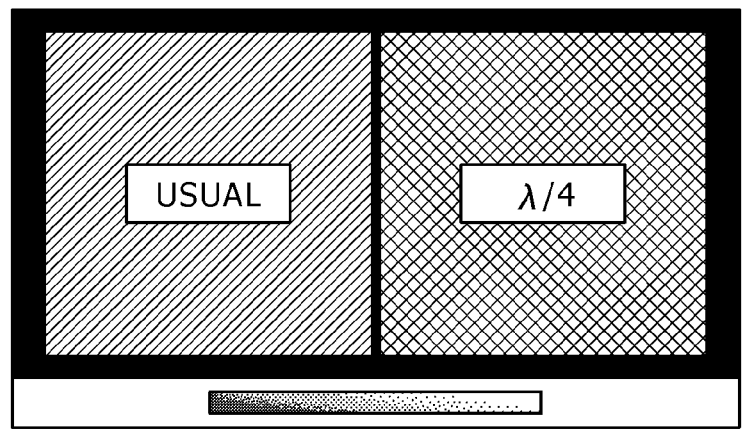
FIGS. 9A to 9C are drawings showing that the S/N is enhanced by adhesion of the phase difference plate.
Figure 9B:
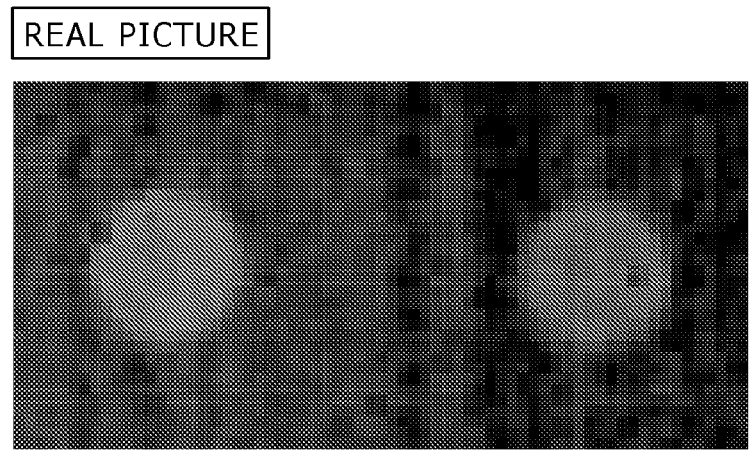
Figure 9C:
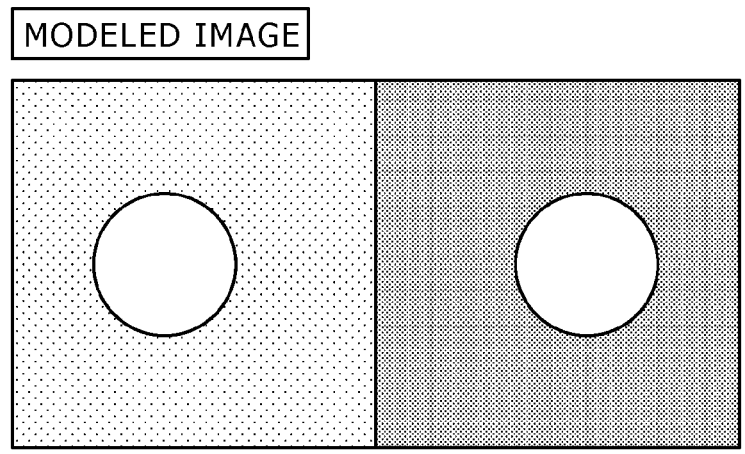

FIGS. 9A to 9C demonstrate the enhancement of the S/N by adhesion of the phase difference plate 29. In FIGS. 9A to 9C, the left corresponds to the case where the phase difference plate is absent, and the right corresponds to the case where the phase difference plate is present.

It is clearly seen from the figures that the S/N is enhanced when the phase difference plate is present.

Figure 10:
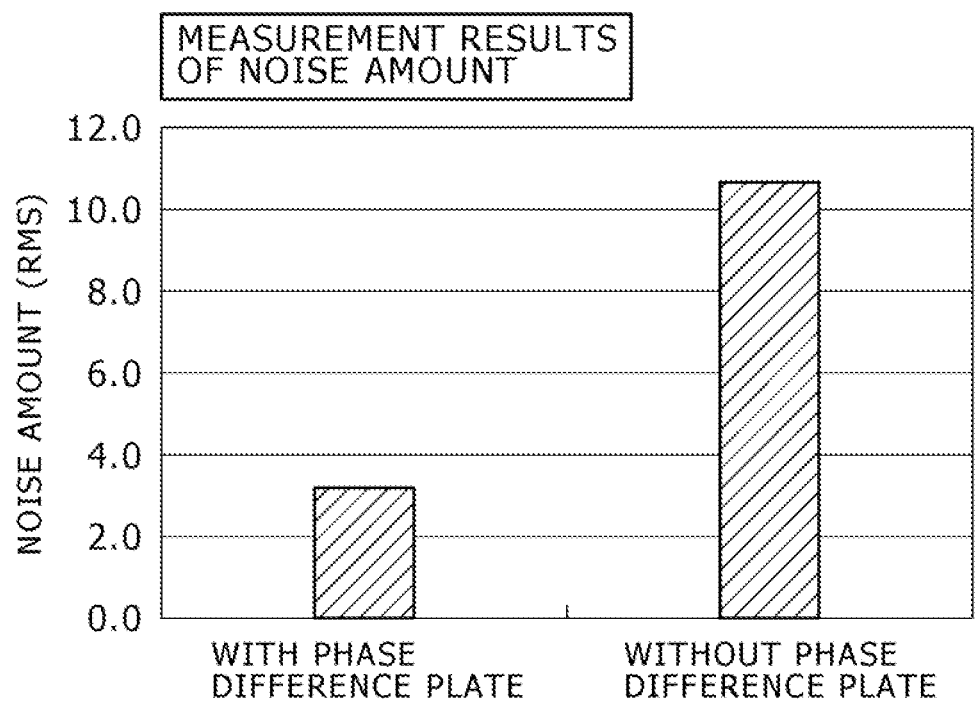
FIG. 10 is a diagram showing the measurement results of noise amount depending on the presence or absence of the phase difference plate.

FIG. 10 is a diagram showing the measurement results of noise amount depending on the presence or absence of the phase difference plate.

As is clear from FIG. 10, the noise amount is remarkably reduced when the phase difference plate is present.

First Modified Example

Figure 11:
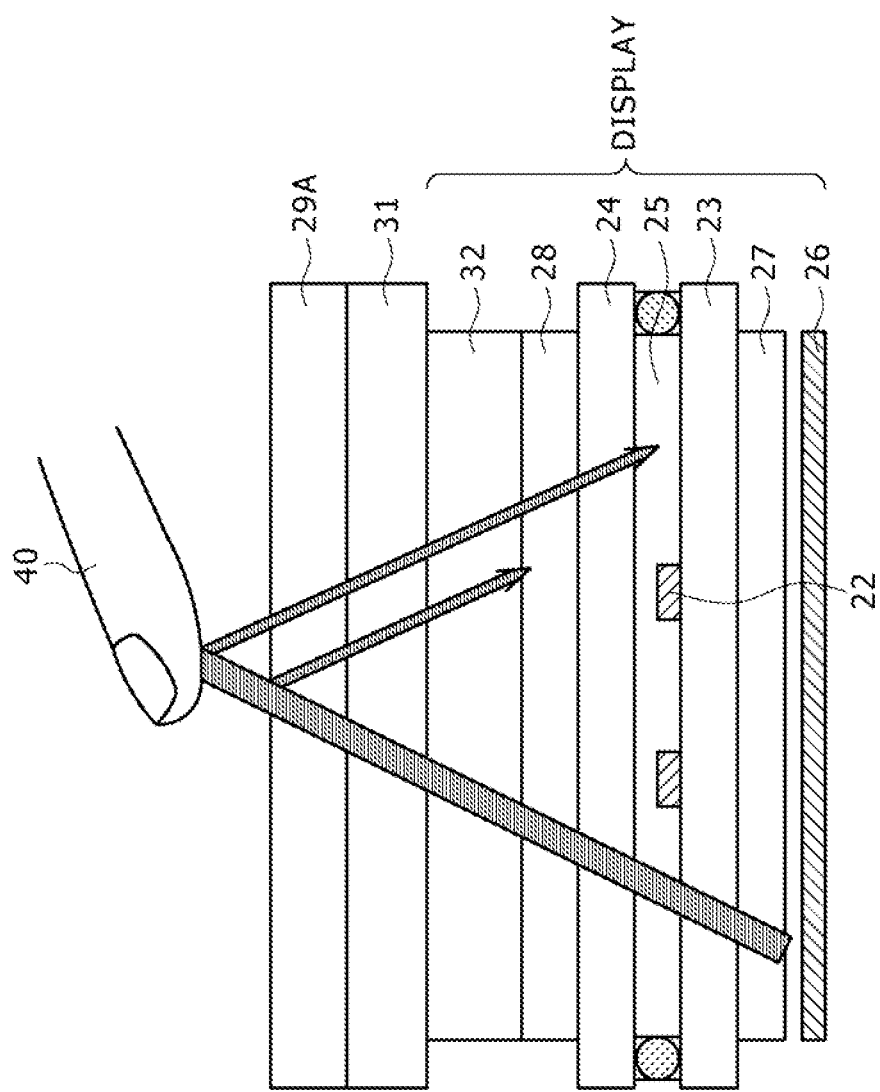
FIG. 11 is a drawing showing a first modified example of an embodiment in which a filler layer including a transparent resin is disposed between the LCD module and the transparent protective cover so as to eliminate the reflection at the interface.

FIG. 11 is a drawing showing a first modified example of an embodiment in which a filler layer including a transparent resin is disposed between the LCD module and the transparent protective cover so as to eliminate the reflection at the interface.

In this example, a filler layer 32 including a transparent resin having a refractive index of more than 1 is disposed, in place of the air layer 30, between the back-side surface of the transparent protective cover 31 and the front-side surface of the second polarizing plate 28. Besides, the phase difference plate 29A is disposed on the front side of the transparent protective cover 31.

In this case, the difference in refractive index between the second polarizing plate at the most face-side surface of the LCD and the transparent resin and the difference in refractive index between the transparent protective cover and the transparent resin are so small that the reflections at the interfaces are not dominant.

In this case, the interfacial reflectance occurs most severely at the interface between the most face-side surface of the transparent protective cover and the air.

Therefore, the phase difference plate 29A is adhered to the most face-side surface of the transparent protective cover 31 so as to enhance the S/N most.

Second Modified Example

Figure 12:
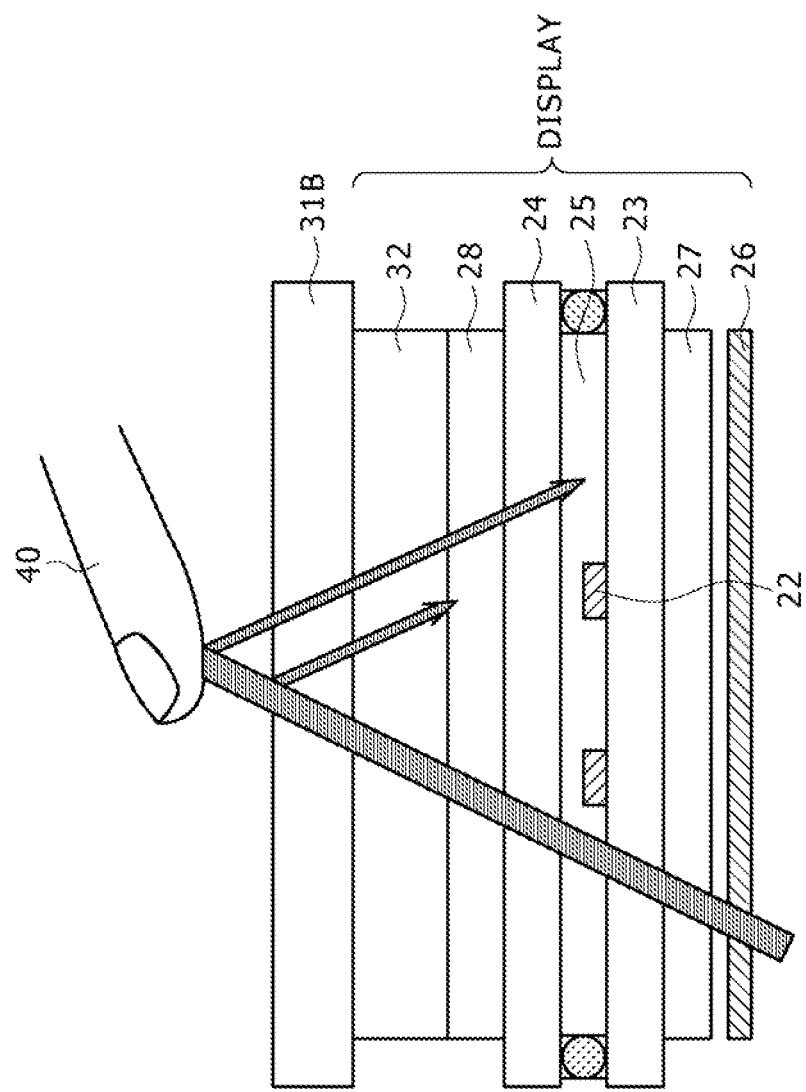
FIG. 12 is a drawing showing a second modified example of the embodiment in which the filler layer including a transparent resin is disposed between the LCD module and the transparent protective cover so as to eliminate the reflection at the interface.

FIG. 12 is a drawing showing a second modified example of the embodiment in which the filler layer including a transparent resin is disposed between the LCD module and the transparent protective cover so as to eliminate the reflection at the interface.

In this example, a transparent protective cover 31B is provided with characteristics of a phase difference plate. This makes it possible to reduce the number of component members.

In either of the above-mentioned two forms, the phase difference plate is disposed to provide the most face-side surface, which is considered to lead to a lowering in strength of the LCD module.

To cope with this problem, the face-side surface of the phase different plate was subjected to a hard coating treatment so as to enhance resistance to marring.

As has been described above, according to the present embodiment, the display includes the plurality of display cells 21 each having the display circuit 210, and the light receiving cells 22 each having the light receiving element 221. In addition, the display has the back light 26 operative to illuminate the display surface at a predetermined luminance, the first transparent substrate (TFT substrate) 23 disposed opposite to the back light 26 and provided with cell circuits and the light receiving elements, the second transparent substrate (opposite substrate) 24 disposed opposite to the TFT substrate 23, the liquid crystal layer 25 disposed between the TFT substrate 23 and the opposite substrate 24, the second polarizing plate 28 formed at that surface of the TFT substrate 23 which faces the back light 26, and the transparent protective cover 31 disposed on the front side of the opposite substrate 24. Further, the display has the phase difference plate 29 formed at the interface of the second polarizing plate 28 with the air layer 30, or, alternatively, has the filler layer 32 having a refractive index of more than 1 and arranged in place of the air layer, and the phase difference plate 29A formed at the interface of the transparent protective cover 31 with the air layer on the front side. As a result of this configuration, the following effects can be obtained.

The adhesion of the phase difference plate 29 to the most face-side surface of the photosensor-incorporating, inputting function-provided type display makes it possible to eliminate the reflected light reflected from the most face-side surface, whereby the S/N of the photo-sensors can be improved.

The adhesion of the phase difference plate 29 to the most face-side surface of the photosensor-incorporating, inputting function-provided type display makes it possible to eliminate the reflected light reflected from the transparent protective cover on the front side, whereby the S/N can be improved.

In the case where the gap between the photosensor-incorporating, inputting function-provided type display and the transparent protective cover at an upper part is closed by adhering with a resin (liquid or solid) or the like having a refractive index of not less than 1, the adhesion of the phase difference plate to the most face-side surface of the transparent protective cover makes it possible to eliminate the reflected light reflected at the interface between the transparent protective cover and the air, whereby the S/N can be improved.

The photosensor-incorporating, inputting function-provided type display with the phase difference plate adhered to the most face-side surface thereof permits the use of linearly polarized light polarized in a certain direction, irrespectively of the polarization direction.

In the above description, the case where a transparent protective cover is used has been taken as an example.

Figure 13:
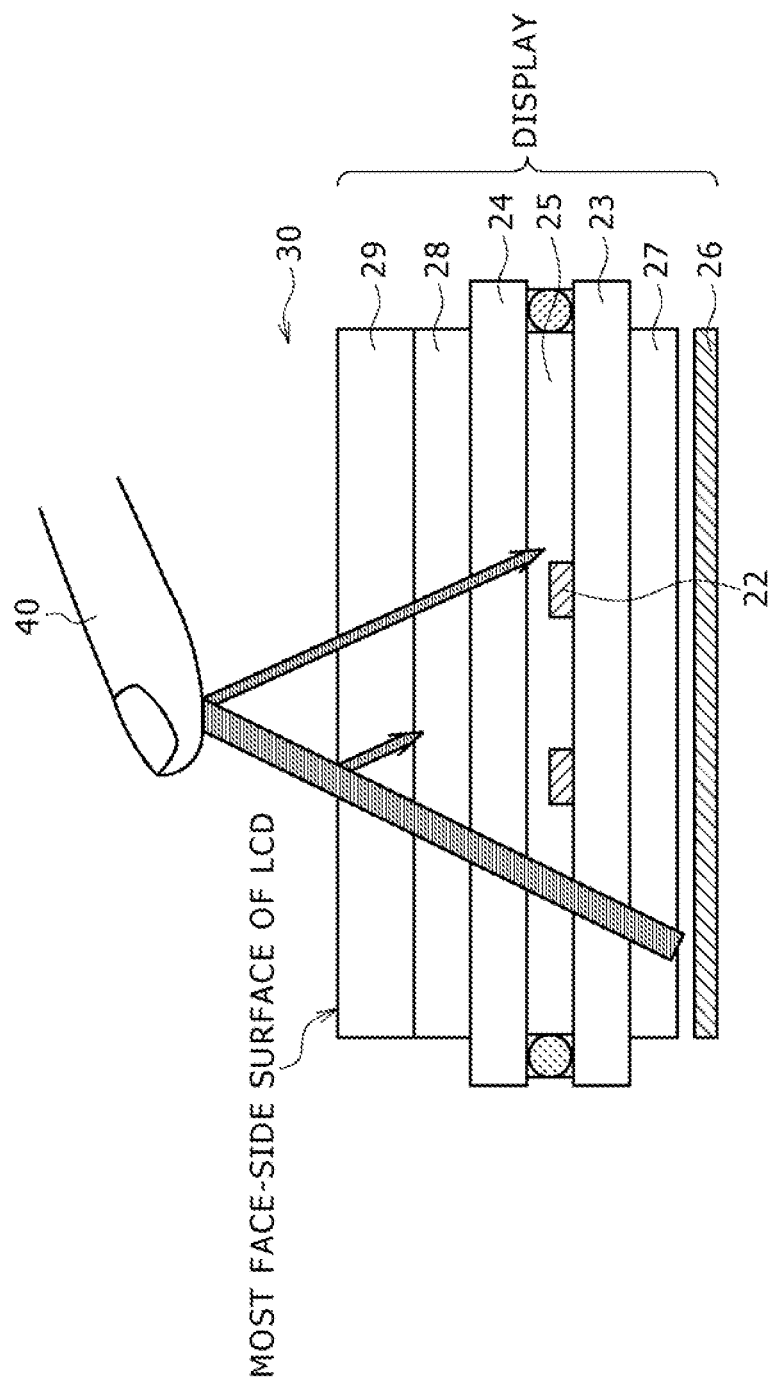
FIG. 13 illustrates that the noise due to reflection on the most face-side surface of the LCD can be eliminated even in the case where the transparent protective cover is not used.

It is to be noted here, however, that the present application is also applicable to the case where no transparent protective cover is used as shown in FIG. 13, and, in that case, the reflection noise which might be generated at the most face-side surface of the LCD can be eliminated.

The example shown in FIG. 13 has a configuration obtained by omitting the transparent protective cover from the configuration example of FIG. 4.

The phase difference plate 29 is formed at the interface of the second polarizing plate 28 on the front side (upper side) with the air layer 30 on the front side thereof. In other words, the front-side surface of the phase difference plate 29 constitutes the most face-side surface of the LCD.

The function of the phase difference plate 29 as a circularly polarizing plate, the mechanism of reflection of the back-light light, and the like are basically the same as in the case of FIG. 4, so that detailed descriptions of them are omitted here.

Incidentally, while the wavelength of light has not been referred to in the present embodiment, the embodiment is applicable to any wavelength region. Particularly, the embodiment is applicable to the infrared region of light as well as to the visible light region. For the light in the infrared region (700 nm and more in wavelength), also, the same effects as above-mentioned can be attained.

Figure 14:
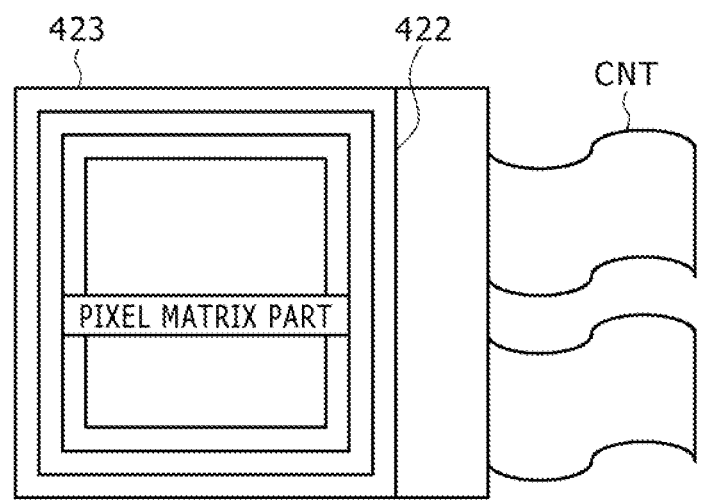
FIG. 14 is a schematic view showing an example of a flat type module shape.

The displays according to the embodiments of the present application include those of a flat module shape as shown in FIG. 14.

For example, a pixel array part in which pixels each including a liquid crystal element, a thin film transistor, a thin film capacitor, a light receiving element, etc. are stacked in a matrix form is provided on an insulating substrate 422, an adhesive is so disposed as to surround the pixel array part (pixel matrix part), and an opposite substrate of a glass or the like is adhered, to obtain a display module.

The transparent opposite substrate 423 may be provided with color filters, a protective film, a light intercepting film or the like, if necessary. The display module may be provided with, for example, an FPC (flexible printed circuit) as a connector CNT for inputting/outputting signals or the like from the exterior to the pixel array part and vise versa.

The displays according to the embodiments described above are applicable to displays in various electronic apparatuses shown in any field for displaying a picture signal inputted to the electronic apparatus or a picture signal produced in the electronic apparatus as an image or picture, for example, portable terminal devices (mobile apparatuses) such as digital camera, notebook size personal computer, mobile phone, etc., desktop type personal computer, video camera, etc., as shown in FIGS. 15 to 19G.

Now, examples of electronic apparatus to which the embodiments are applied will be described below.

Figure 15:
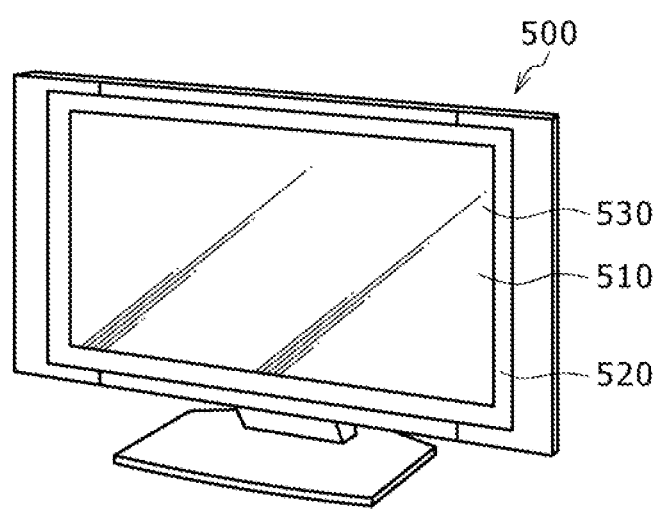
FIG. 15 is a perspective view of a television set to which the present embodiment is applied.

FIG. 15 is a perspective view of a television set to which the present embodiments are applicable.

The television set 500 according to the present application example includes a picture display section 510 composed of a front panel 520, a filter glass 530, etc., and is manufactured by using the display according to the present embodiment as the picture display screen section 510 thereof.

Figure 16A:
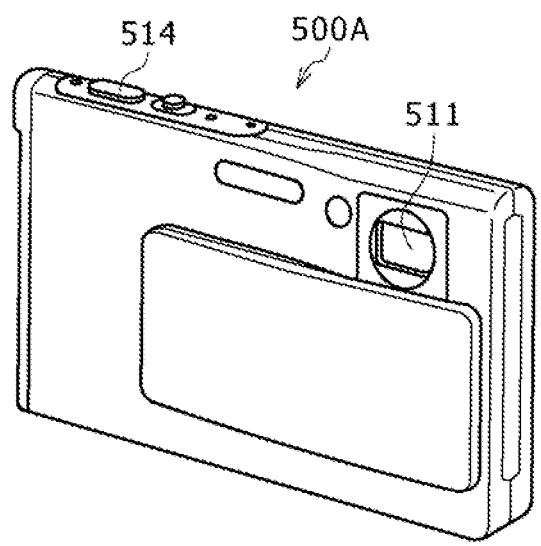
FIGS. 16A and 16B are perspective views of a digital camera to which the present embodiment is applied.
Figure 16B:
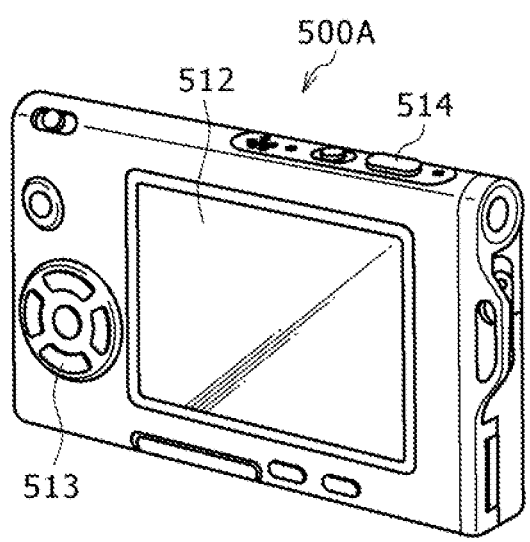

FIGS. 16A and 16B are perspective views of a digital camera to which the present embodiments are applicable, wherein FIG. 16A is a perspective view from the front side, and FIG. 16B is a perspective view from the back side.

The digital camera 500A according to the present embodiment includes a flash light emitting section 511, a display section 512, a menu switch 513, a shutter button 514, etc., and is manufactured by using the display according to the present embodiment as the display section 512 thereof.

Figure 17:
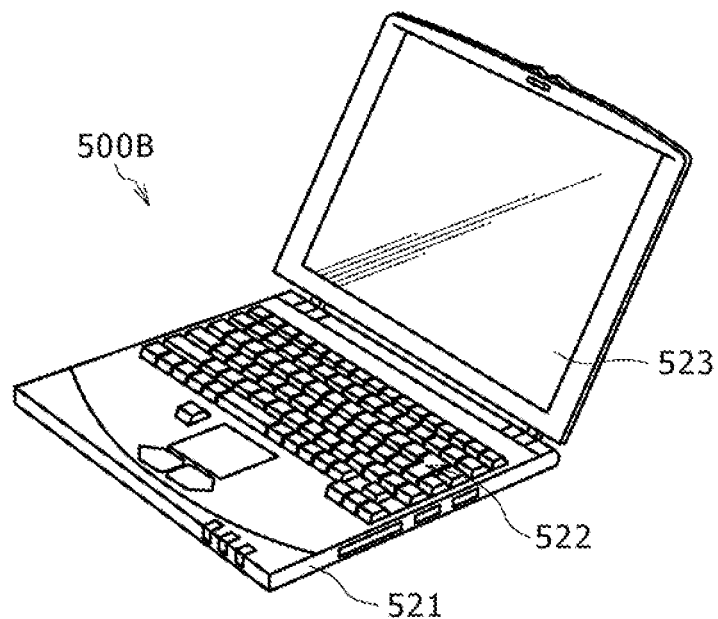
FIG. 17 is a perspective view of a notebook size personal computer to which the present embodiment is applied.

FIG. 17 is a perspective view of a notebook size personal computer to which the present embodiments are applicable.

The notebook size personal computer 500B according to the present application example includes a main body 521, a keyboard 522 operated to input characters or the like, a display section 523 for displaying images, etc., and is manufactured by using the display according to the present embodiment as the display section 523 thereof.

Figure 18:
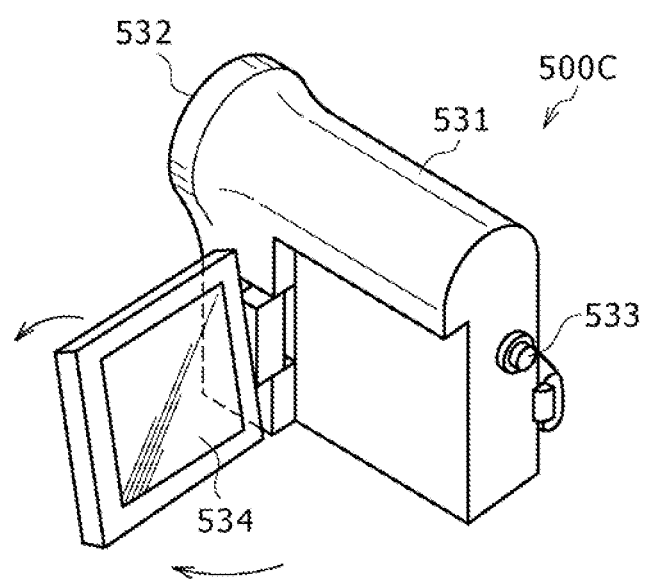
FIG. 18 is a perspective view of a video camera to which the present embodiment is applied.

FIG. 18 is a perspective view of a video camera to which the present embodiments are applicable.

The video camera 500C according to the present application example includes a main body section 531, an object shooting lens 532 provided at a side surface facing forwards, a shooting start/stop switch 533, a display section 534, etc., and is manufactured by using the display according to the present embodiment as the display section 534 thereof.

FIGS. 19A to 19G illustrate a portable terminal device, for example, a mobile phone to which the present embodiments are applicable, wherein FIG. 19A is a front view of the mobile phone in its opened state, FIG. 19B is a side view of the same, FIG. 19C is a front view of the mobile phone in its closed state, FIG. 19D is a left side view, FIG. 19E is a right side view, FIG. 19F is a top view, and FIG. 19G is a bottom view.

The mobile phone 500D according to the present application example includes an upper-side casing 541, a lower-side casing 542, a connecting part (here, a hinge part) 543, a display 544, a sub-display 545, a picture light 546, a camera 547, etc., and is manufactured by using the display according to the present embodiment as the display 544 and/or the sub-display 545 thereof.

In addition, the displays according to the present embodiments are applicable to the following display and imaging apparatus. Besides, the display and imaging apparatus is applicable to the above-mentioned various electronic apparatuses.

Figure 20:
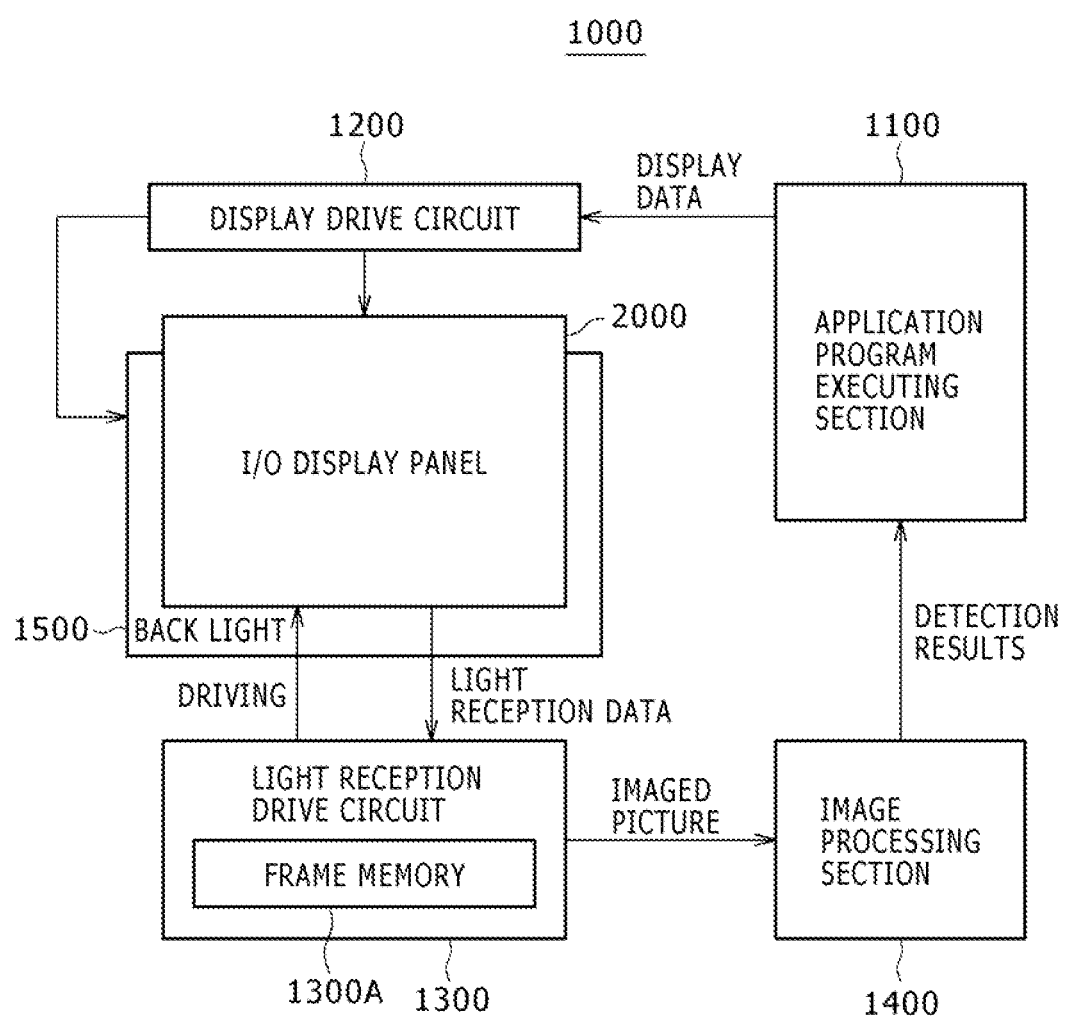
FIG. 20 is a block diagram showing the configuration of a display and imaging apparatus according to one embodiment.

FIG. 20 is a block diagram showing the general configuration of a display and imaging apparatus.

The display and imaging apparatus 1000 includes an I/O display panel 2000, a back light 1500, a display drive circuit 1200, a light reception drive circuit 1300, an image processing section 1400, and an application program executing section 1100.

The I/O display panel 2000 includes a liquid crystal panel (LCD (Liquid Crystal Display)) in which a plurality of pixels are arranged in a matrix pattern over the whole surface, has a function of displaying predetermined images such as figures and characters based on display data while performing a line-sequential operation (displaying function), and has a function of imaging an object coming into contact with or coming into proximity to the I/O display panel 2000 as will be described later (imaging function).

Besides, the back light 1500 is a light source for the I/O display panel 2000, including a plurality of light emitting diodes, and is so designed to perform high-speed ON/OFF operations at a timing synchronous to the operation timing of the I/O display panel 2000 as will be described later.

The display drive circuit 1200 is a circuit for driving the I/O display panel 2000 so that an image based on the display data is displayed on the I/O display panel 2000 (so as to perform a displaying operation) (a circuit for driving the line-sequential operation).

The light reception drive circuit 1300 is a circuit for driving the I/O display panel 2000 so that light reception data is obtained in the I/O display panel 2000 (so as to image an object) (a circuit for driving the line-sequential operation). Incidentally, the image reception data at each pixel is stored in a frame memory 1300A on a frame basis, for example, before being outputted to the image processing section 14 as an imaged picture.

The image processing circuit 1400 performs a predetermined image processing (arithmetic process) based on the imaged picture outputted from the light reception drive circuit 1300, and detects and acquires information on an object coming into contact with or coming into proximity to the I/O display panel 2000 (positional coordinate data, data on the shape and/or size of the object, etc.). Incidentally, details of the detecting process will be described later.

The application program executing section 1100 executes a process according to a predetermined application software on the basis of the results of detection by the image processing section 1400, and examples thereof include an executing section in which positional coordinates of the object detected are contained in the display data, to be displayed on the I/O display panel 2000.

Incidentally, the display data produced in the application program executing section 1100 is supplied to the display drive circuit 1200.

Figure 21:
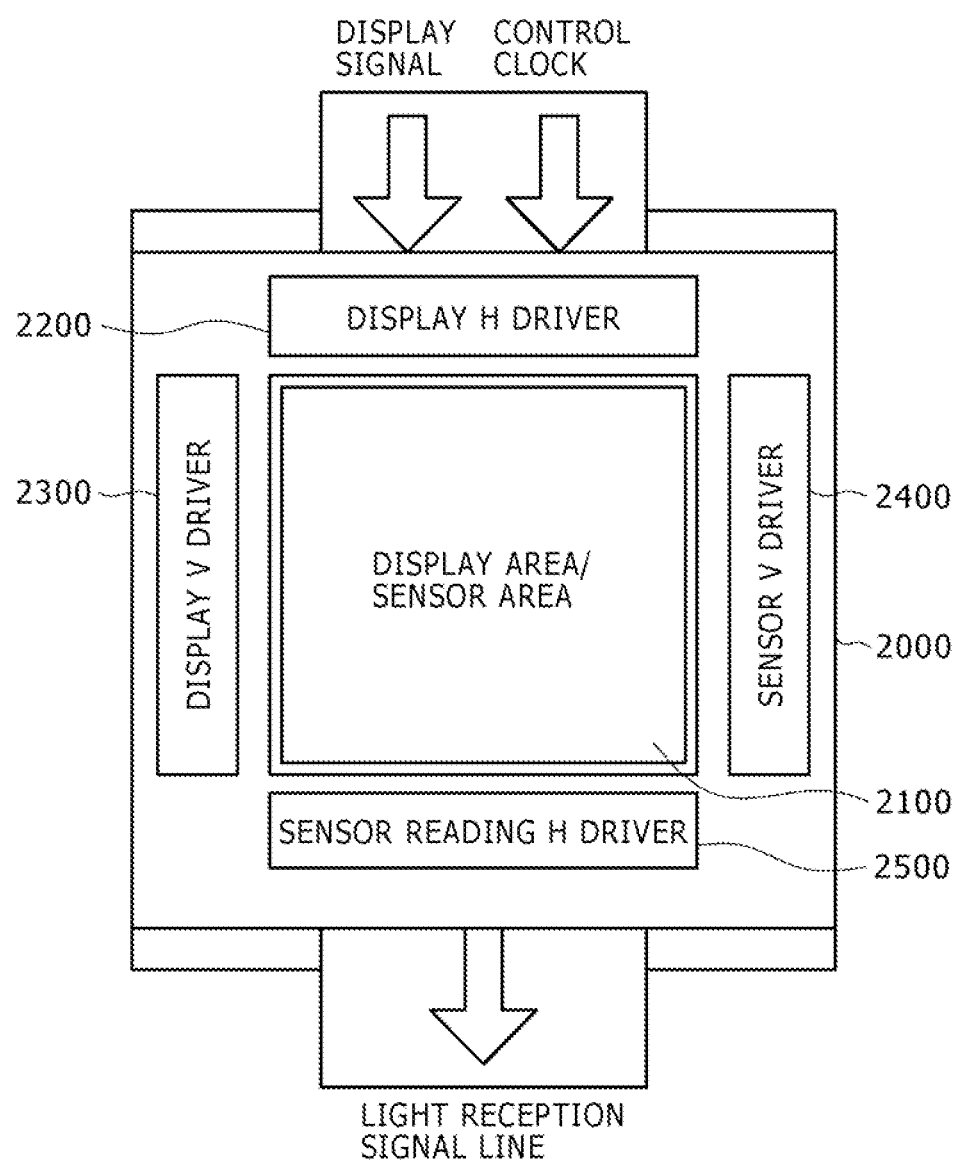
FIG. 21 is a block diagram showing a configuration example of the I/O display panel shown in FIG. 20.

Now, a detailed configuration example of the I/O display panel 2000 will be described below, referring to FIG. 21. The I/O display panel 2000 has a display area (sensor area) 2100, a display H driver 2200, a display V driver 2300, a sensor reading H driver 2500, and a sensor V driver 2400.

The display area (sensor area) 2100 is an area for emitting display light obtained by modulating the light from the back light 1500 and for imaging an object coming into contact with or coming into proximity to the area, and liquid crystal elements as light emitting elements (display elements) and light receiving elements (imaging elements) to be described later are arranged in the area in respective matrix patterns.

The display H driver 2200 drives the liquid crystal elements of the pixels in the display area 2100 on a line-sequential basis together with the display V driver 2300, based on a display signal and a control clock which are supplied from the display drive circuit 1200 for a display driving purpose.

The sensor reading H driver 2500 is operative to acquire a light reception signal by driving the light receiving elements of the pixels in the sensor area 2100 on a line-sequential basis together with the sensor V driver 2400.

Figure 22:
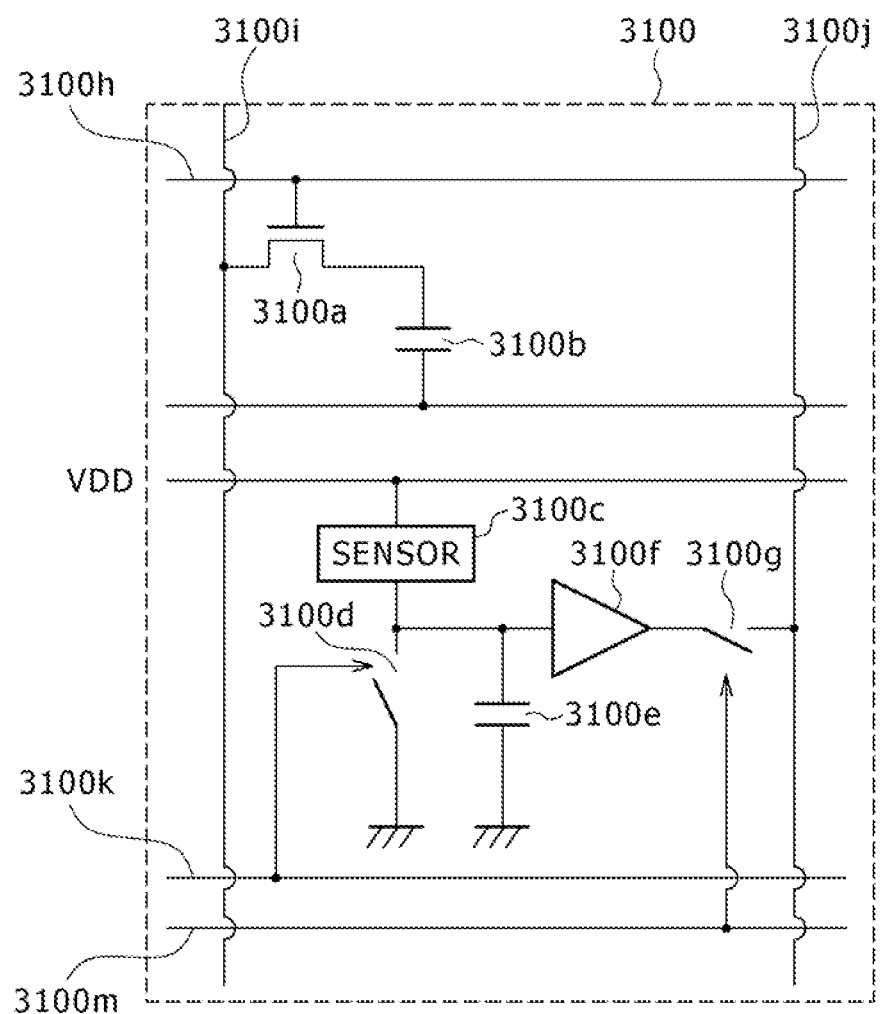
FIG. 22 is a circuit diagram showing a configuration example of each pixel.

Now, a detailed configuration example of each pixel in the display area 2100 will be described below, referring to FIG. 22. The pixel 3100 shown in FIG. 22 includes a liquid crystal element, which is a display element, and a light receiving element.

Specifically, on the display element side, a switching element 3100*a* composed of a thin film transistor (TFT) or the like is disposed at the intersection between a gate electrode 3100*h* extending in a horizontal direction and a drain electrode 3100*i* extending in the vertical direction, and a pixel electrode 3100*b* containing a liquid crystal is disposed between the switching element 3100*a* and an opposite electrode.

The switching element 3100*a* performs ON/OFF operations based on a driving signal supplied through the gate electrode 3100*h*. When the switching element 3100*a* is in the ON state, a pixel voltage is impressed on the pixel electrode 3100*b* on the basis of a display signal supplied through the drain electrode 3100*i*, whereby a display state is set.

On the other hand, on the side of the light receiving element adjacent to the display element, a light receiving sensor 3100*c* composed, for example, of a photo-diode or the like is disposed, and is supplied with a power source voltage VDD.

In addition, a reset switch 3100*d* and a capacitor 3100*e* are connected to the light receiving sensor 3100*c*, and, while resetting by the reset switch 3100*d* is conducted, an electric charge corresponding to the amount of light received is accumulated in the capacitor 3100*e*.

At the timing of turning-ON of the reading switch 3100*g*, the accumulated charge is supplied through a buffer amplifier 3100*f* to a signal outputting electrode 3100*j*, and is outputted to the exterior. In addition, the ON/OFF operations of the reset switch 3100*d* are controlled by a signal supplied by a reset electrode 3100*k*, whereas the ON/OFF operations of the reading switch 3100*g* are controlled by a signal supplied by a reading control electrode 3100*m*.

Figure 23:
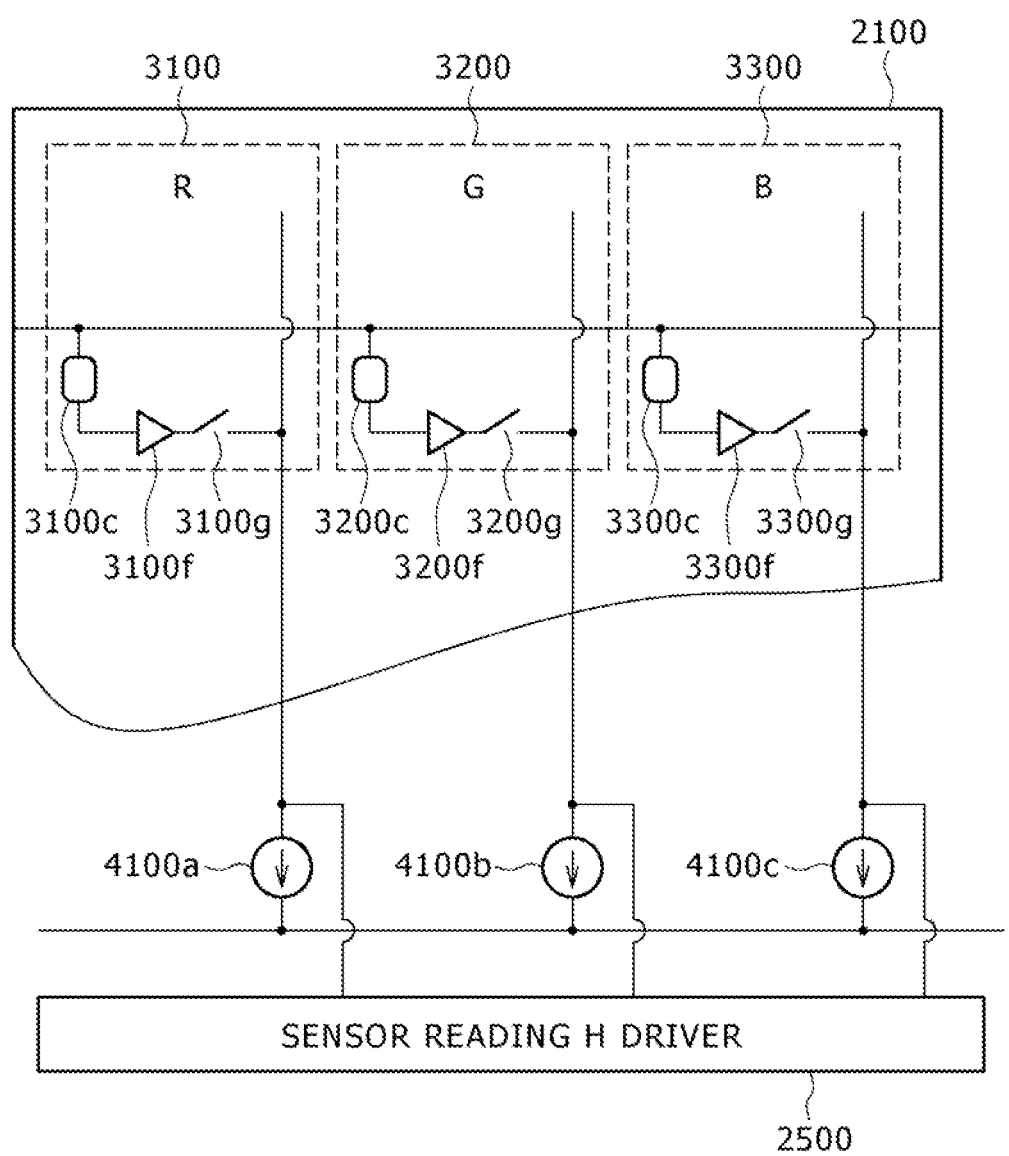
FIG. 23 is a circuit diagram for illustrating the connection relationship between each pixel and a sensor reading H driver.

Now, the connection relation between each pixel in the display area 2100 and the reading H driver 2500 will be described below, referring to FIG. 23. In the display area 2100, a red (R) pixel 3100, a green (G) pixel 3200, and a blue (B) pixel 3300 are arranged side by side.

Electric charges accumulated in capacitors connected to light emitting sensors 3100*c*, 3200*c*, 3300*c* of each pixel are amplified by respective buffer amplifiers 3100*f*, 3200*f*, 3300*f*, and are supplied to the sensor reading H driver 2500 through signal outputting electrodes at timings of turning-ON of the reading switches 3100*g*, 3200*g*, 3300*g*.

Incidentally, constant current sources 4100*a*, 4100*b*, 4100*c* are connected respectively to the signal outputting electrodes, and signals corresponding to the quantity of light received are detected with good sensitivity by the sensor reading H driver 2500.

Now, the operations of the display and imaging apparatus will be described in detail below.

First, basic operations of the display and imaging apparatus, specifically, an image displaying operation and an object imaging operation will be described.

In this display, based on display data supplied from the application program executing section 1100, a display driving signal is generated in the display drive circuit 1200, and the I/O display panel 2000 is driven by the driving signal to perform line-sequential display, whereby an image is displayed.

In this instance, the back light 1500 is also driven by the display drive circuit 1200 so as to perform turning-ON/OFF operations synchronous with the I/O display panel 2000.

Figure 24:
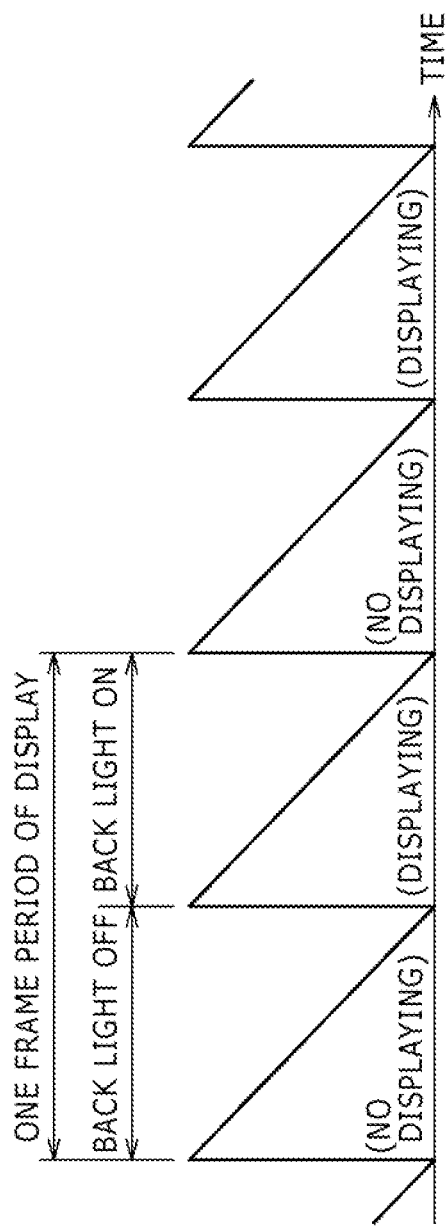
FIG. 24 is a timing chart for illustrating the relationship between the ON/OFF state of a back light and the display condition.

Here, referring to FIG. 24, the relation between the ON/OFF state of the back light 1500 and the display state of the I/O display panel 2000 will be described. In FIG. 24, time is taken on the axis of abscissas, and the positions in the vertical direction of the rows scanned for imaging, of the light receiving elements of the pixels, are taken on the axis of ordinates.

First, in the case where image display is conducted with a frame period of 1/60 sec, for example, the back light 1500 is kept OFF (kept in the OFF state) for the former half period (1/120 sec) of each frame period, so that no display is made. On the other hand, for the latter half period of each frame period, the back light 1500 is kept ON (kept in the ON state), whereby display signals are supplied to the pixels, and an image for the frame period is displayed.

Thus, the former half period of each frame period is a no-light period in which no display light is emitted from the I/O display panel 2000; on the other hand, the latter half period of each frame period is a light-present period for which the display light is emitted from the I/O display panel 2000.

Here, when an object (for example, a fingertip or the like) coming into contact with or coming into proximity to the I/O display panel 2000 is present, the object is imaged by the light receiving elements of the pixels in the I/O display panel 2000 through the line-sequential light reception driving by the light reception drive circuit 1300 in the no-light period and the light-present period, and light reception signals from the light receiving elements are supplied to the light reception drive circuit 1300. In the light reception drive circuit 1300, light reception signals from the pixels in an amount corresponding to one frame are accumulated, to be outputted to the image processing section 1400 as an imaged picture.

Then, in the image processing section 1400, a predetermined image processing (arithmetic process) is conducted based on the imaged picture, whereby information on the object coming into contact with or coming into proximity to the I/O display panel 2000 (positional coordinate data, data on the shape and size of the object, etc.) is detected.

For example, by determining the differences in a picture imaged in the no-light period (OFF period) and a picture imaged in the light-present period (ON period), it is possible to remove external light and to obtain picture information based on the light emitted from the back light 1500 and reflected by the object coming into contact with or coming into proximity to the I/O display panel 2000 in the light-present period. From the picture information, data reaching or exceeding a predetermined threshold are extracted and digitized (converted into a binary variable), followed by image processing for determining the coordinates of the center of gravity, etc., whereby information on the object coming into contact with or into proximity to the I/O display panel 2000 can be obtained.

Besides, in the case where infrared light for detection is outputted from the back light 1500 together with visible light, a method may be adopted in which the infrared light component is turned ON and OFF, whereas the visible light component is normally turned ON.

The embodiments are applicable not only to LCDs but also to such displays as organic EL displays and electronic papers (E-papers).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display comprising:
   at least one display cell having a display circuit;
   a light emitting section operative to radiate light toward a front side of the display;
   a first polarizing plate disposed above the light emitting section toward the front side of the display, and disposed in regions in which said display cell and a light receiving cell are formed, the light receiving cell including a light receiving element formed above the first polarizing plate;
   a second polarizing plate formed above the light receiving cell;
   a first transparent substrate disposed above the second polarizing plate toward the front side of the display, and disposed in either of an emitting optical path of said light emitting section and a reflecting optical path toward said light receiving cell; and
   a second transparent substrate disposed above first transparent substrate toward the front side of the display,
   wherein the first polarization plate, the second polarization plate, and the first transparent substrate are configured such that light radiated outward from the light emitting section through the first polarization plate, the second polarization plate, and the first transparent substrate, and then reflected back toward the light emitting section by either an upper or lower surface of the second transparent substrate is absorbed by the second polarization plate after being transmitted again through the first transparent substrate.

2. The display as set forth in claim 1,
   wherein an air layer exists between the first transparent substrate and the second transparent substrate.

3. The display as set forth in claim 2,
   wherein said first transparent substrate emits light coming out of the second polarizing plate, as circularly polarized light.

4. The display as set forth in claim 2,
   wherein a surface of said first transparent substrate has been subjected to a hard coating treatment.

5. The display as set forth in claim 1,
   wherein the first transparent substrate is a phase difference plate, and the second transparent substrate is a protective transparent substrate.

6. The display as set forth in claim 1,
   wherein a filler layer having a refractive index of more than 1 is disposed between said second polarizing plate and the second transparent substrate.

7. The display as set forth in claim 6,
   wherein a surface of the first transparent substrate has been subjected to a hard coating treatment.

8. The display as set forth in claim 1, wherein the second transparent substrate includes a lower surface on a side nearer to the first transparent substrate and an upper surface opposite thereto, and the upper surface of the second transparent substrate is an exposed outer surface of the display.

9. The display as set forth in claim 1, wherein the first transparent substrate is a first phase difference plate, the display further comprising a second phase difference plate formed above the second transparent substrate.

10. A display comprising:
    at least one display cell having a display circuit;
    at least one light receiving cell including a light receiving element;
    a back light operative to illuminate a front side of the display at a predetermined luminance;
    a first polarizing plate disposed above the back light toward the front side of the display;
    a first transparent substrate provided with said display cell and said light receiving element, and provided above the first polarizing plate;
    a second transparent substrate disposed opposite to said first transparent substrate;
    a liquid crystal layer disposed between said first transparent substrate and said second transparent substrate;
    a second polarizing plate formed above the second transparent substrate;
    a third transparent substrate disposed above the second polarizing plate, and disposed in either of an emitting optical path of said back light and a reflecting optical path toward said light receiving cell; and
    a fourth transparent substrate disposed above the third transparent substrate toward the front side of the display.

11. The display as set forth in claim 10,
    wherein an air layer exists between the third transparent substrate and the fourth transparent substrate.

12. The display as set forth in claim 11,
    wherein the second third substrate emits light coming out of said second polarizing plate, as circularly polarized light.

13. The display as set forth in claim 11,
    wherein a surface of the third transparent substrate has been subjected to a hard coating treatment.

14. The display as set forth in claim 10,
wherein the third transparent substrate is a phase difference plate, and the fourth transparent substrate is a protective transparent substrate.

15. The display as set forth in claim 10,
wherein a filler layer having a refractive index of more than 1 is disposed between the second polarizing plate and the fourth transparent substrate.

16. The display as set forth in claim 15,
wherein a surface of the third transparent substrate has been subjected to a hard coating treatment.

17. The display as set forth in claim 10, wherein the first polarization plate, the second polarization plate, and the third transparent substrate are configured such that light radiated outward from the back light through the first polarization plate, the second polarization plate, and the third transparent substrate, and then reflected back toward the back light by either an upper or lower surface of the fourth transparent substrate is absorbed by the second polarization plate after being transmitted again through the third transparent substrate.

18. An electronic apparatus comprising:
a processor; and
a display operable with the processor, the display including:
   at least one display cell having a display circuit;
   at least one light receiving cell including a light receiving element;
   a back light operative to illuminate a front side of the display at a predetermined luminance;
   a first polarizing plate disposed above the back light toward the front side of the display;
   a first transparent substrate provided with said display cell and said light receiving element, and provided above the first polarizing plate;
   a second transparent substrate disposed opposite to said first transparent substrate;
   a liquid crystal layer disposed between said first transparent substrate and said second transparent substrate;
   a second polarizing plate formed above the second transparent substrate;
   a third transparent substrate disposed above the second polarizing plate, and disposed in either of an emitting optical path of said back light and a reflecting optical path toward said light receiving cell; and
   a fourth transparent substrate disposed above the third transparent substrate toward the front side of the display.

19. The electronic apparatus as set forth in claim 18,
wherein the third transparent substrate is a phase difference plate, and the fourth transparent substrate is a protective transparent substrate.

* * * * *